United States Patent
Crothers

(10) Patent No.: US 9,789,609 B2
(45) Date of Patent: Oct. 17, 2017

(54) SUBSTANTIALLY SIMULTANEOUS MANUFACTURING FUNCTIONS

(71) Applicant: The Boeing Company, Chicago, IL (US)

(72) Inventor: Phillip John Crothers, Hampton East (AU)

(73) Assignee: THE BOEING COMPANY, Chicago, IL (US)

( * ) Notice: Subject to any disclaimer, the term of this patent is extended or adjusted under 35 U.S.C. 154(b) by 107 days.

(21) Appl. No.: 14/630,945

(22) Filed: Feb. 25, 2015

(65) Prior Publication Data
US 2016/0243702 A1 Aug. 25, 2016

(51) Int. Cl.
| | |
|---|---|
| *B25J 9/16* | (2006.01) |
| *B64F 5/00* | (2017.01) |
| *B25J 9/00* | (2006.01) |
| *B25J 11/00* | (2006.01) |
| *B23K 37/04* | (2006.01) |
| *B23P 21/00* | (2006.01) |
| *B25J 5/00* | (2006.01) |

(52) U.S. Cl.
CPC ......... *B25J 9/1669* (2013.01); *B23K 37/0435* (2013.01); *B23P 21/00* (2013.01); *B25J 5/007* (2013.01); *B25J 9/009* (2013.01); *B25J 9/0084* (2013.01); *B25J 9/1612* (2013.01); *B25J 9/1687* (2013.01); *B25J 11/005* (2013.01); *B64F 5/00* (2013.01); *B23P 2700/01* (2013.01); *Y10S 901/08* (2013.01)

(58) Field of Classification Search
CPC ...... B25J 9/1669; B25J 9/1612; B25J 9/1687; B25J 11/0005; B25J 13/006; B25J 9/1682; B25J 9/0093; B25J 9/0096; B25J 9/0087; B25J 9/0084; Y10S 901/08; G05B 19/418; B23K 37/0435; B23K 37/047; B23P 21/00–21/008; B64F 5/00; B64F 5/10; B66C 5/02; B66C 19/005
See application file for complete search history.

(56) References Cited

U.S. PATENT DOCUMENTS

| | | | |
|---|---|---|---|
| 8,925,185 B2 * | 1/2015 | Sarh | B25J 5/00 29/34 B |
| 2004/0143951 A1 * | 7/2004 | Berninger | B23K 37/0435 29/428 |
| 2008/0006653 A1 * | 1/2008 | Dai | B01L 3/0268 222/75 |

(Continued)

OTHER PUBLICATIONS

Lauwers et al., "Progress in Agile Assembly: Minifactory Couriers Based on Free-Roaming Planar Motors," International Workshop on Microfactories, Oct. 2004, pp. 7-10.

*Primary Examiner* — Abby Lin
(74) *Attorney, Agent, or Firm* — Yee & Associates, P.C.

(57) ABSTRACT

A method and apparatus for performing manufacturing functions on a workpiece. The apparatus may comprise a base, a plurality of autonomous functional components, and a plurality of autonomous movement systems. Each functional component of the plurality of autonomous functional components may be configured to perform a respective function. The plurality of autonomous movement systems may be associated with the base. Each of the plurality of autonomous movement systems may be connected to a respective functional component of the plurality of autonomous functional components.

32 Claims, 21 Drawing Sheets

(56) References Cited

U.S. PATENT DOCUMENTS

| | | | |
|---|---|---|---|
| 2009/0012647 A1* | 1/2009 | Kamiya | B25J 9/1669 |
| | | | 700/248 |
| 2011/0132548 A1* | 6/2011 | De Mattia | B29C 70/386 |
| | | | 156/577 |
| 2012/0011693 A1* | 1/2012 | Amirehteshami | B23P 21/002 |
| | | | 29/428 |
| 2012/0116585 A1* | 5/2012 | Yoshima | B23K 9/1062 |
| | | | 700/248 |
| 2012/0217128 A1* | 8/2012 | Joergensen | B23P 21/004 |
| | | | 198/339.1 |
| 2013/0247829 A1* | 9/2013 | Taneja | A01K 5/0291 |
| | | | 119/51.11 |
| 2014/0100693 A1* | 4/2014 | Fong | G05D 1/0274 |
| | | | 700/253 |
| 2015/0115515 A1* | 4/2015 | Takahashi | B25J 9/0087 |
| | | | 269/293 |
| 2015/0314890 A1* | 11/2015 | DesJardien | B64F 5/0009 |
| | | | 212/324 |
| 2016/0016311 A1* | 1/2016 | Konolige | B25J 5/007 |
| | | | 700/245 |

* cited by examiner

SUBSTANTIALLY SIMULTANEOUS MANUFACTURING FUNCTIONS

BACKGROUND INFORMATION

1. Field

The present disclosure generally relates to manufacturing and, in particular, to performing manufacturing functions on a workpiece. Still more particularly, the present disclosure relates to a method and apparatus for substantially simultaneously performing a plurality of manufacturing functions on a workpiece.

2. Background

A workpiece may be formed of a number of structures including a number of layers of material. A number of manufacturing functions may be performed to form the workpiece. Further, a number of manufacturing functions may be performed to join the workpiece to other structures.

The number of manufacturing functions may include drilling, inspection, fastening, or other desirable functions. The fastening functions may include, for example, bonding operations, riveting operations, bolting operations, other types of attachment operations, or some combination thereof.

With some currently available methods for forming and joining workpieces, the manufacturing functions may be performed manually by a number of operators. For example, without limitation, a first human operator positioned at a first side of the workpiece and a second human operator positioned at a second side of the workpiece may use handheld tools to perform fastening functions. However, in some cases, performing manufacturing functions manually may be more labor-intensive, time-consuming, ergonomically challenging, or expensive than desired. Further, the safety of the human operators in a manufacturing environment may be a concern.

With some currently available methods for forming and joining workpieces, the manufacturing functions may be performed by a robotic arm. The operations of the robotic arm may be limited to the reach of the robotic arm. The robotic arm may have a number of end effectors which may each perform a number of manufacturing functions. A single facet end effector may perform a single function. Thus, the robotic arm may be able to perform a number of manufacturing functions. The robotic arm may exchange a first end effector for a second end effector to perform a different manufacturing function. However, the time spent exchanging end effectors may be an undesirable amount of time. A multi-facet end effector may be able to perform multiple functions. However, a robotic arm may only be able to perform a single manufacturing function at a time using the multi-facet end effector.

Further, to decrease the amount of time to form or join a workpiece, additional robotic arms and additional end effectors may be used. Each robotic arm may only perform a single manufacturing function at a time. In some cases, performing manufacturing functions using robotic arms, each with a number of end effectors, may be more time-consuming or expensive than desired.

With some currently available methods for forming and joining workpieces, the manufacturing functions may be performed by a number of robotic arms. In some examples, each of the robotic arms may conduct a discrete function. As a result, the workpiece may be moved from one robot to another as each discrete function is conducted. In other examples, each robotic arm may perform multiple functions, but each function may be performed independently.

Therefore, it would be desirable to have a method and apparatus that take into account at least some of the issues discussed above, as well as other possible issues. Specifically, it may be desirable to find a method and apparatus for reducing at least one of manufacturing time or manufacturing cost of performing functions on a workpiece.

SUMMARY

An illustrative embodiment of the present disclosure provides a method. The method may comprise performing a plurality of functions on a first plurality of locations on a workpiece substantially simultaneously using a plurality of autonomous functional components. Each of the plurality of functions is different than each other function of the plurality of functions. The method may move the plurality of autonomous functional components relative to the workpiece and relative to a base using a plurality of autonomous movement systems associated with the base after performing the plurality of functions.

Another illustrative embodiment of the present disclosure provides an apparatus. The apparatus may comprise a base, a plurality of autonomous functional components, a plurality of autonomous clamping components, and a plurality of autonomous movement systems. Each autonomous functional component of the plurality of autonomous functional components may be configured to perform a respective function. The plurality of autonomous movement systems may be associated with the base. Each of the plurality of autonomous movement systems may be connected to a respective functional component of the plurality of autonomous functional components.

Yet another illustrative embodiment of the present disclosure provides an apparatus. The apparatus comprises a base, a movement assembly, a plurality of autonomous clamping components, a plurality of autonomous functional components, a plurality of autonomous movement systems, and a controller. The movement assembly may be connected to the base and configured to move the base relative to a workpiece. The plurality of autonomous clamping components may have a plurality of operating envelopes. Each functional component of the plurality of autonomous functional components may be configured to perform a different respective single function on the workpiece through an operating envelope of the plurality of operating envelopes. The plurality of autonomous movement systems may be associated with the base. Each of the plurality of autonomous movement systems may be connected to a respective functional component of the plurality of autonomous functional components or a respective clamping component of the plurality of autonomous clamping components. The controller is in communication with at least one of the movement assembly, the plurality of autonomous clamping components, the plurality of autonomous functional components, or the plurality of autonomous movement systems.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
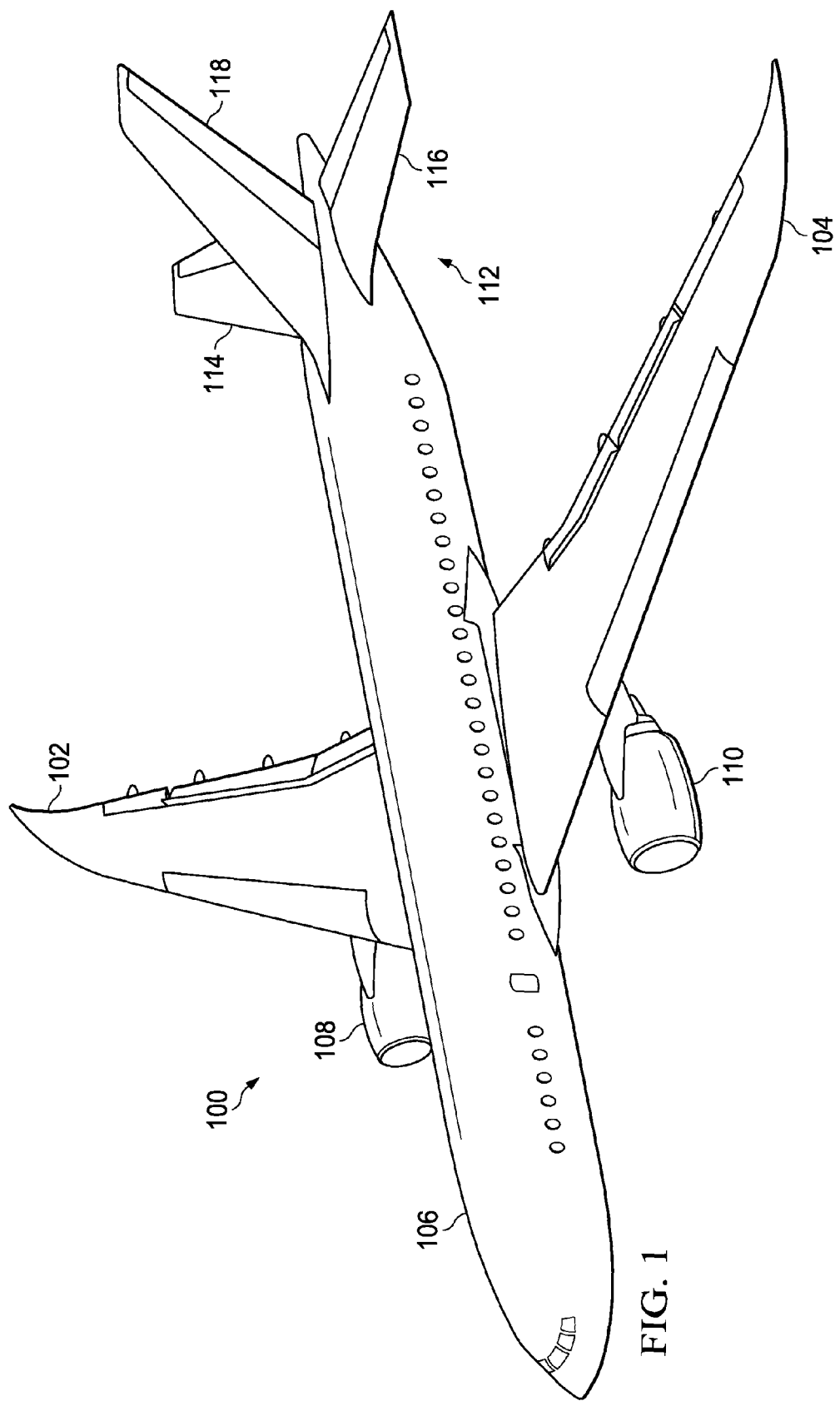
FIG. 1 is an illustration of an aircraft in accordance with an illustrative embodiment.

With reference now to the figures, and in particular with reference to FIG. 1, an illustration of an aircraft is depicted in accordance with an illustrative embodiment. In this illustrative example, aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft having components which may be manufactured in accordance with an illustrative embodiment. For example, body 106 of aircraft 100 may be manufactured using substantially simultaneous manufacturing functions.

Figure 22:
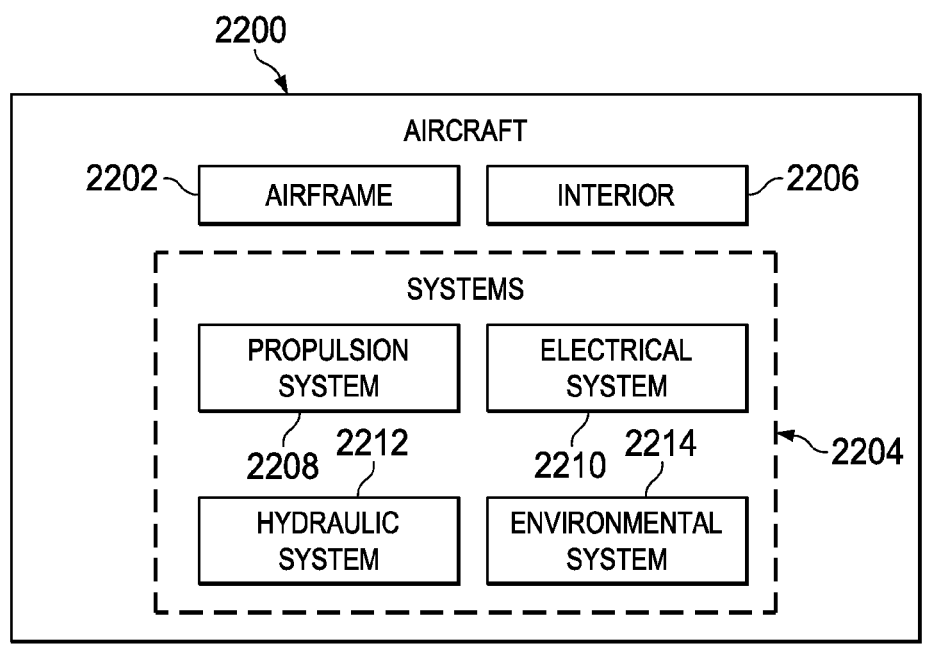
FIG. 22 is an illustration of a block diagram of an aircraft in which an illustrative embodiment may be implemented.

This illustration of aircraft 100 is provided for purposes of illustrating one environment in which the different illustrative embodiments may be implemented. The illustration of aircraft 100 in FIG. 1 is not meant to imply architectural limitations as to the manner in which different illustrative embodiments may be implemented. For example, aircraft 100 is shown as a commercial passenger aircraft. The different illustrative embodiments may be applied to other types of aircraft, such as private passenger aircraft, a military aircraft, a rotorcraft, and other suitable types of aircraft. For example, an illustration of a block diagram of an aircraft 2200 is depicted in FIG. 22 described below.

Although the illustrative examples for an illustrative embodiment are described with respect to an aircraft, the illustrative embodiment may be applied to other types of platforms. The platform may be, for example, a mobile platform, a stationary platform, a land-based structure, an aquatic-based structure, and a space-based structure. More specifically, the platform may be a surface ship, a tank, a personnel carrier, a train, a spacecraft, a space station, a satellite, a submarine, an automobile, a power plant, a bridge, a dam, a house, a manufacturing facility, a building, and other suitable platforms.

Figure 2:
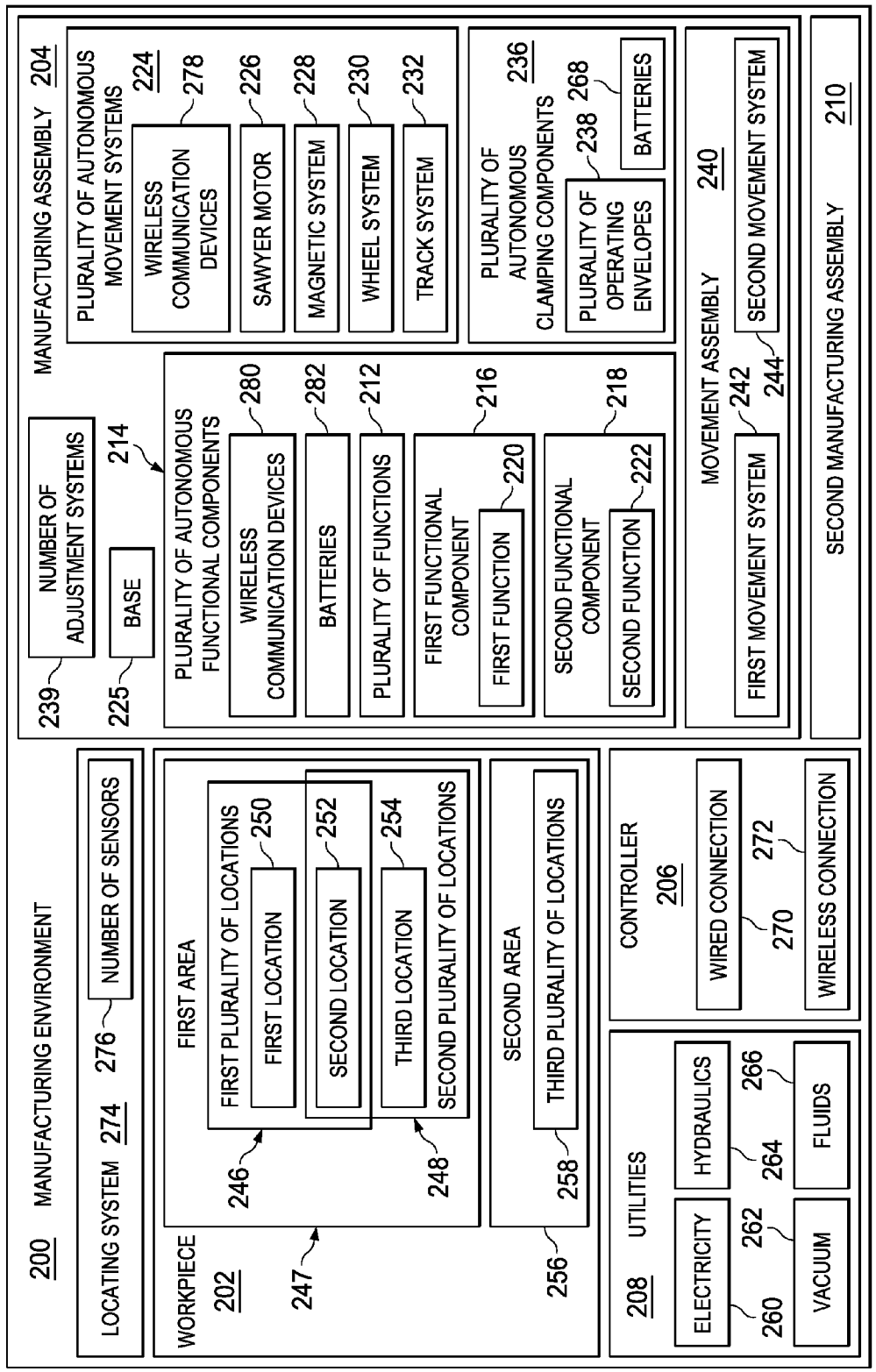
FIG. 2 is an illustration of a block diagram of a manufacturing environment in accordance with an illustrative embodiment.

Turning now to FIG. 2, an illustration of a block diagram of a manufacturing environment is depicted in accordance with an illustrative embodiment. Manufacturing environment 200 may be used to perform a plurality of manufacturing functions on workpiece 202. In some illustrative examples, workpiece 202 may be a portion of aircraft 100 of FIG. 1, such as wing 102 or wing 104. Manufacturing environment 200 may include workpiece 202, manufacturing assembly 204, controller 206, utilities 208, and second manufacturing assembly 210.

Manufacturing assembly 204 may perform plurality of functions 212 on workpiece 202 using plurality of autonomous functional components 214. Each functional component of plurality of autonomous functional components 214 may be configured to perform a respective single function of plurality of functions 212. In some illustrative examples, each functional component of plurality of autonomous functional components 214 may be configured to perform a different single function from another functional component of plurality of autonomous functional components 214. In some illustrative examples, at least two functional components of plurality of autonomous functional components 214 may be configured to perform the same or substantially similar functions. Plurality of autonomous functional components 214 may include first functional component 216 and second functional component 218. First functional component 216 may perform first function 220 of plurality of functions 212. Second functional component 218 may perform second function 222 of plurality of functions 212. First function 220 and second function 222 may be different functions. In one illustrative example, first function 220 may be drilling while second function 222 may be inspecting. In another illustrative example, first function 220 may be sealing while second function 222 may be fastening.

Plurality of autonomous functional components 214 may be associated with plurality of autonomous movement systems 224. Plurality of autonomous movement systems 224 may allow plurality of autonomous functional components 214 to move relative to base 225 of manufacturing assembly 204. Each of plurality of autonomous functional components 214 may be associated with a respective movement system of plurality of autonomous movement systems 224. Plurality of autonomous movement systems 224 may be selected from at least one of sawyer motor 226, magnetic system 228, wheel system 230, track system 232, or some other desirable motion system.

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations. The item may be a particular object, thing, or a category. In other words, at least one of means any combination of items and number of items may be used from the list but not all of the items in the list are required.

Sawyer motor 226 may be a type of linear electric motor. Sawyer motor 226 may use air bearings to allow for low-resistance movements. Respective air bearings may be deactivated during performance of functions by plurality of autonomous functional components 214. Respective air bearings may be deactivated during clamping of plurality of autonomous clamping components 236. Sawyer motor 226 may create an air cushion to allow for movement of a functional component.

Magnetic system 228 may allow for magnetic levitation of at least one of plurality of autonomous functional components 214 or plurality of autonomous clamping components 236. Magnetic levitation may allow for low-resistance movements.

Plurality of autonomous movement systems 224 may allow plurality of autonomous functional components 214 to move relative to base 225 of manufacturing assembly 204. Sawyer motor 226, magnetic system 228, and wheel system 230 may each allow movement in two dimensions relative to base 225. Track system 232 may allow movement in a single dimension. Track system 232 may be moved relative to base 225 to allow movement of plurality of autonomous functional components 214 in a second dimension relative to base 225.

Each of plurality of autonomous movement systems 224 may be connected to a respective functional component of plurality of autonomous functional components 214 or a respective clamping component of plurality of autonomous clamping components 236. Plurality of autonomous movement systems 224 may allow for independent motion of at least one of plurality of autonomous functional components 214 or plurality of autonomous clamping components 236. For example, each of plurality of autonomous functional components 214 may move relative to base 225 independently of each other functional component of plurality of autonomous functional components 214. Further, each of plurality of autonomous functional components 214 may move relative to base 225 independently of each clamping component of plurality of autonomous clamping components 236. As another example, each of plurality of autonomous clamping components 236 may move relative to base 225 independently of each other clamping component of plurality of autonomous clamping components 236. Further, each of plurality of autonomous clamping components 236 may move relative to base 225 independently of each functional component of plurality of autonomous functional components 214.

Base 225 may have a constant curvature. By having a constant curvature, base 225 may be used with sawyer motor 226 or magnetic system 228. A surface having a constant curvature may include a planar surface. In some illustrative examples, base 225 may have a constant curvature such that base 225 may be used to manufacture a portion of body 106 of aircraft 100 in FIG. 1, having constant curvature.

Plurality of autonomous clamping components 236 may be associated with plurality of autonomous movement systems 224. Plurality of autonomous clamping components 236 may move relative to base 225 using plurality of autonomous movement systems 224. Plurality of autonomous clamping components 236 may provide plurality of operating envelopes 238 through which plurality of autonomous functional components 214 may perform plurality of functions 212. Plurality of autonomous clamping components 236 may apply pressure to workpiece 202 to provide plurality of operating envelopes 238.

In some illustrative examples, plurality of autonomous clamping components 236 may only apply pressure to one side of workpiece 202. In these illustrative examples, other tools may apply counter pressure to workpiece 202. For example, another tool may apply pressure to an opposite side of workpiece 202.

Each of plurality of autonomous functional components 214 may be configured to perform a respective single function through a respective operating envelope of plurality of operating envelopes 238. In some illustrative examples, plurality of autonomous clamping components 236 may be greater in number than plurality of autonomous functional components 214. By plurality of autonomous clamping components 236 being greater in number than plurality of autonomous functional components 214, plurality of autonomous functional components 214 may continue to perform plurality of functions 212 without having to wait for plurality of autonomous clamping components 236 to move relative to base 225. By plurality of autonomous clamping components 236 being greater in number than plurality of autonomous functional components 214, manufacturing time may be reduced.

Plurality of functions 212 may be a set of sequential functions. A set of sequential functions may be a series of functions which occur in a specific order. For example, to install fasteners, plurality of functions 212 may include drilling, measuring, sealing, and fastening functions. In other illustrative examples, plurality of functions 212 may include other functions. For example, plurality of functions 212 may include sealing and inspecting the seals. Plurality of functions 212 may include at least one of drilling, inspecting, inserting an item, and securing an item. Plurality of functions 212 may include any desirable number of functions greater than or equal to two.

Each of plurality of autonomous functional components 214 may move independently of each other functional component of plurality of autonomous functional components 214 using plurality of autonomous movement systems 224. Each of plurality of autonomous clamping components 236 may move independently of each other clamping component of plurality of autonomous clamping components 236. Each of plurality of autonomous clamping components 236 may move independently of each of plurality of autonomous functional components 214 using plurality of autonomous movement systems 224.

Number of adjustment systems 239 may rotate, tilt, or otherwise adjust at least one of a functional component in plurality of autonomous functional components 214 or a clamping component of plurality of autonomous clamping components 236 independent of movement of plurality of autonomous movement systems 224. Number of adjustment systems 239 may be associated with at least one movement system of plurality of autonomous movement systems 224. An adjustment system of number of adjustment systems 239 and a movement system of plurality of autonomous movement systems 224 may move at least one of a functional component in plurality of autonomous functional components 214 or a clamping component in plurality of autonomous clamping components 236 in a desirable number of degrees of freedom. For example, an adjustment system of number of adjustment systems 239 and a movement system of plurality of autonomous movement systems 224 may work in conjunction to move a functional component in plurality of autonomous functional components 214 in six degrees of freedom. In some illustrative examples, the movement system of plurality of autonomous movement systems 224 may move the functional component in plurality of autonomous functional components 214 in at least two degrees of translation. In some illustrative examples, the adjustment system of number of adjustment systems 239 may move the functional component in plurality of autonomous functional components 214 in at least two degrees of rotation.

Manufacturing assembly 204 may also include movement assembly 240. Movement assembly 240 may move base 225 relative to workpiece 202. By moving base 225 relative to workpiece 202, movement assembly 240 may also move plurality of autonomous clamping components 236 and plurality of autonomous functional components 214 relative to workpiece 202. Movement assembly 240 may include any desirable number of movement systems. Movement assembly 240 may include first movement system 242 and second movement system 244. In some illustrative examples, movement assembly 240 may only include one movement system. In some illustrative examples, movement assembly 240 may have more than two movement systems. Movement assembly 240 may take the form of at least one of a number of manipulators, a number of robots, a number of cranes, a number of crawlers, or any other desirable type of movement systems.

Manufacturing assembly 204 may be used to perform plurality of functions 212 at first plurality of locations 246 in first area 247. Movement assembly 240 may move base 225 relative to workpiece 202 such that plurality of autonomous functional components 214 and plurality of autonomous clamping components 236 may access first plurality of locations 246. Plurality of autonomous clamping components 236 may be positioned using at least one of movement assembly 240 and plurality of autonomous movement systems 224 such that plurality of operating envelopes 238 of plurality of autonomous clamping components 236 are positioned over first plurality of locations 246. Plurality of autonomous functional components 214 may then perform plurality of functions 212 on first plurality of locations 246 on workpiece 202 substantially simultaneously. Plurality of autonomous functional components 214 may then perform plurality of functions 212 on second plurality of locations 248 on workpiece 202 substantially simultaneously.

In some illustrative examples, first plurality of locations 246 and second plurality of locations 248 may overlap. For example, first plurality of locations 246 may include first location 250 and second location 252. Second plurality of locations 248 may include second location 252 and third location 254.

First functional component 216 may perform first function 220 on second location 252. Second functional component 218 may perform second function 222 on first location 250 substantially simultaneously. After completing first function 220 and second function 222 on second location 252 and first location 250, respectively, first functional component 216 and second functional component 218 may move relative to base 225. First functional component 216 may then perform first function 220 relative to third location 254. Second functional component 218 may perform second function 222 on second location 252 substantially simultaneously.

Second area 256 may not be accessible by plurality of autonomous functional components 214 when base 225 is positioned relative to first area 247. In some illustrative examples, base 225 may be moved relative to second area 256 so that plurality of autonomous functional components 214 may perform plurality of functions 212 on third plurality of locations 258. In some illustrative examples, second manufacturing assembly 210 may have a respective plurality of autonomous functional components which may perform a plurality of functions. Second manufacturing assembly 210 may be positioned relative to second area 256 such that the respective plurality of autonomous functional components may perform the plurality of functions on third plurality of locations 258.

Utilities 208 may include electricity 260, vacuum 262, hydraulics 264, and fluids 266, or other desirable utilities. For example, utilities 208 may also include desirable utilities not depicted in FIG. 2. In one illustrative example, utilities 208 may also include pressurized air.

Utilities 208 may be provided to plurality of autonomous functional components 214 to perform plurality of functions 212. For example, vacuum 262 may be supplied to remove debris when first function 220 is drilling. As another example, fluids 266 may be supplied to cool first functional component 216 when first function 220 is drilling. Electricity 260 may be provided to plurality of autonomous movement systems 224 to move at least one of plurality of autonomous functional components 214 or plurality of autonomous clamping components 236. Electricity 260 may be provided through wires or other desirable physical connections. In some illustrative examples, rather than receiving electricity 260 from physical connections, at least one of plurality of autonomous functional components 214, plurality of autonomous movement systems 224 associated with plurality of autonomous functional components 214, plurality of autonomous clamping components 236, or plurality of autonomous movement systems 224 associated with plurality of autonomous clamping components 236 may be powered by batteries 268. In some illustrative examples, rather than receiving electricity 260 from physical connections, at least one of plurality of autonomous functional components 214, plurality of autonomous clamping components 236, or plurality of autonomous movement systems 224 may be powered through a wireless technology such as Wi-Fi.

Controller 206 may be implemented in software, hardware, firmware or a combination thereof. When software is used, the operations performed by controller 206 may be implemented in program code configured to run on a processor unit. When firmware is used, the operations performed by controller 206 may be implemented in program code and data and stored in persistent memory to run on a processor unit. When hardware is employed, the hardware may include circuits that operate to perform the operations in controller 206.

Controller 206 may communicate with at least one of plurality of autonomous functional components 214, plurality of autonomous clamping components 236, or plurality of autonomous movement systems 224. Controller 206 may direct or control plurality of functions 212 of plurality of autonomous functional components 214. Controller 206 may direct or control clamping of plurality of autonomous clamping components 236. Controller 206 may direct or control movement of plurality of autonomous movement systems 224.

In some illustrative examples, controller 206 may communicate with at least one of plurality of autonomous functional components 214, plurality of autonomous movement systems 224, or plurality of autonomous clamping components 236 using wired connection 270. In some illustrative examples, controller 206 may communicate with at least one of plurality of autonomous functional components 214, plurality of autonomous movement systems 224, or plurality of autonomous clamping components 236 using wireless connection 272. Each of plurality of autonomous clamping components 236 may be associated with a respective wireless communication device and a respective battery so that each of plurality of autonomous clamping components 236 may be wireless.

The location of each of plurality of autonomous functional components 214, plurality of autonomous movement systems 224, and plurality of autonomous clamping components 236 relative to each other may be important during processing. Further, properly locating the plurality of locations, such as first plurality of locations 246 or second plurality of locations 248, on workpiece 202 which receive plurality of functions 212 may be extremely important. Controller 206 may communicate with other systems or components to track, control, or locate at least one of plurality of autonomous functional components 214, plurality of autonomous movement systems 224, or plurality of autonomous clamping components 236. For example, controller 206 may communicate with locating system 274. Locating system 274 may include number of sensors 276. In some illustrative examples, locating system 274 may be a real-time locating system. Locating system 274 may use any desirable technology. For example, locating system 274 may use radio-frequency identification (RFID), optical sensors, acoustic sensors, or any other desirable type of locating technology. In some examples, the real-time locating system may be a form of a global positioning system (GPS).

In some illustrative examples, number of sensors 276 may be used to determine a location of a component, such as one component of at least one of plurality of autonomous functional components 214, plurality of autonomous movement systems 224, and plurality of autonomous clamping components 236 within manufacturing environment 200. In some illustrative examples, number of sensors 276 may be used to determine a location of a component, such as one component of at least one of plurality of autonomous functional components 214, plurality of autonomous movement systems 224, and plurality of autonomous clamping components 236 relative to workpiece 202.

In illustrative examples in which controller 206 communicates wirelessly with plurality of autonomous movement systems 224, plurality of autonomous movement systems 224 may include wireless communication devices 278. In illustrative examples in which controller 206 communicates wirelessly with plurality of autonomous functional components 214, plurality of autonomous functional components 214 may include wireless communication devices 280. In some illustrative examples, plurality of autonomous functional components 214 may also include batteries 282.

Figure 3:
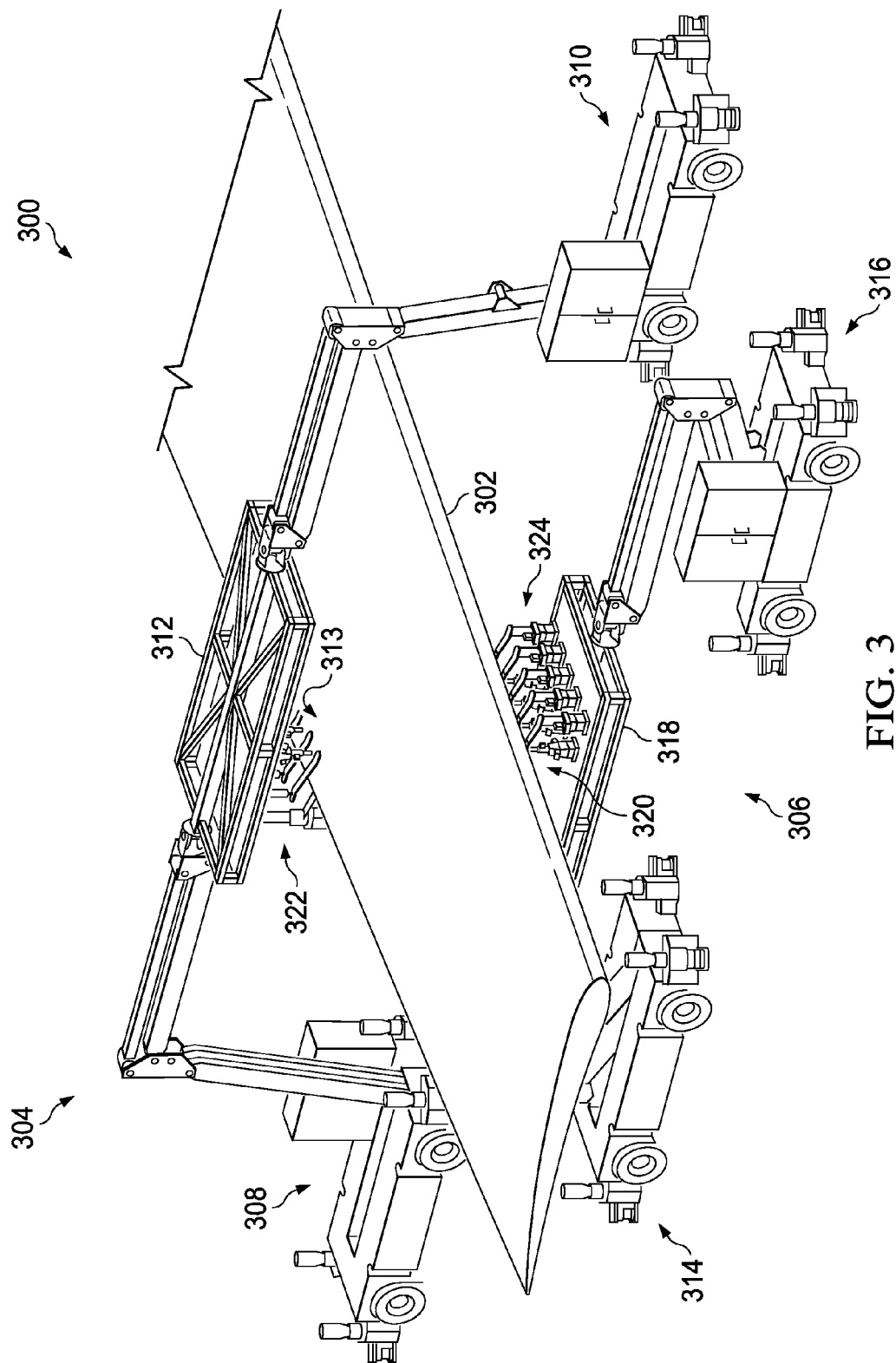
FIG. 3 is an illustration of a manufacturing environment in accordance with an illustrative embodiment.

Turning now to FIG. 3, an illustration of a manufacturing environment is depicted in accordance with an illustrative embodiment. Manufacturing environment 300 may be a physical implementation of manufacturing environment 200 shown in block form in FIG. 2. Manufacturing environment 300 may be an example of an environment in which manufacturing functions may be performed on components of aircraft 100 of FIG. 1 such as wing 102 or wing 104.

Manufacturing environment 300 may include workpiece 302, manufacturing assembly 304, and manufacturing assembly 306. Workpiece 302 may be an example of wing 102 of FIG. 1 prior to attaching wing 102 to aircraft 100. Manufacturing assembly 304 may include movement system 308, movement system 310, and base 312. Workpiece 302 is depicted as substantially planar. As a result, base 312 is also substantially planar. Base 312 may have a substantially constant curvature that complements the shape of workpiece 302. As a result, if workpiece 302 is curved, base 312 may also be curved.

Base 312 may be positioned relative to first area 313 of workpiece 302. Movement system 308 and movement system 310 may move base 312 to position base 312 relative to desired areas of workpiece 302. Manufacturing assembly 306 may include movement system 314, movement system 316, and base 318. Base 318 may be positioned relative to second area 320 of workpiece 302. Movement system 314 and movement system 316 may move base 318 to position base 318 relative to desired areas of workpiece 302.

Plurality of autonomous clamping components 322 is associated with base 312. Plurality of autonomous clamping components 324 is associated with base 318. As depicted, base 312 and base 318 face workpiece 302 such that plurality of autonomous clamping components 322 and plurality of autonomous clamping components 324 may work on workpiece 302.

Manufacturing environment 300 of FIG. 3 is not meant to imply physical or architectural limitations to the manner in which an illustrative embodiment may be implemented. Other components in addition to or in place of the ones illustrated may be used. Some components may be unnecessary. For example, instead of movement system 308 and movement system 310 of manufacturing assembly 304, a number of alternative movement systems may be present. For example, manufacturing assembly 304 may instead have a single robotic arm. As another example, manufacturing assembly 304 may include a crane.

Figure 4:
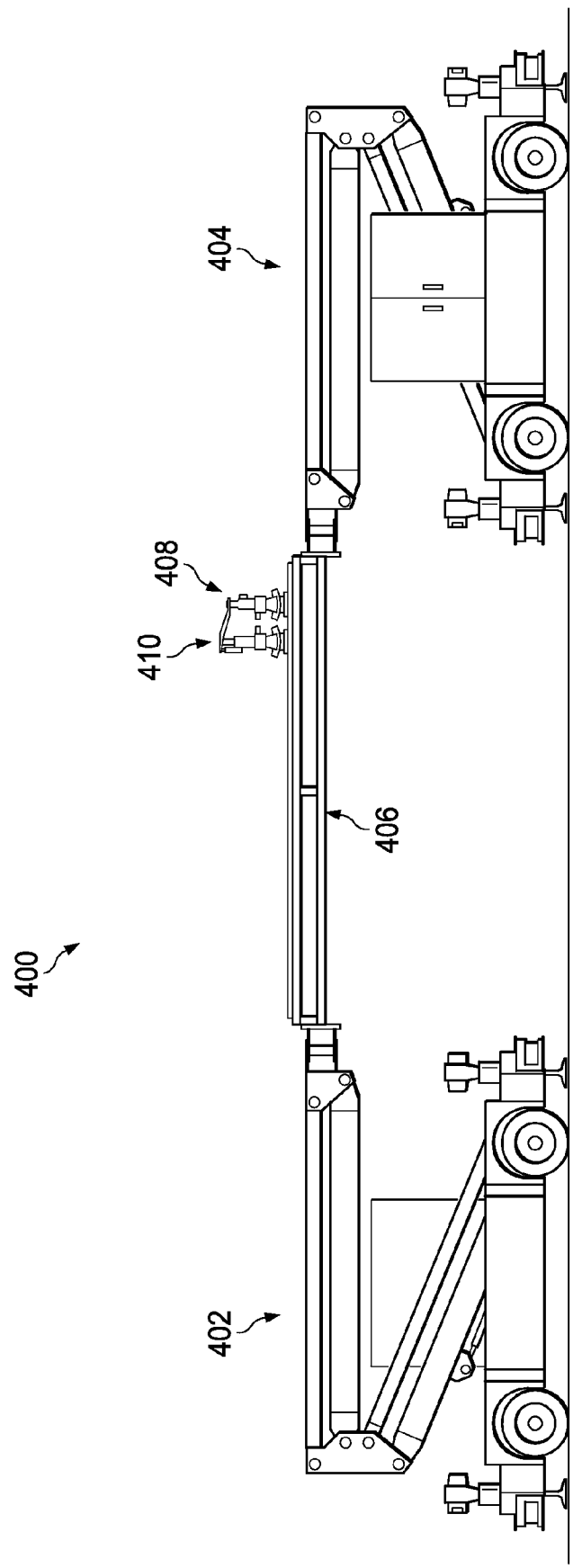
FIG. 4 is an illustration of a manufacturing assembly in accordance with an illustrative embodiment.

Turning now to FIG. 4, an illustration of a manufacturing assembly is depicted in accordance with an illustrative embodiment. Manufacturing assembly 400 may be a physical implementation of manufacturing assembly 204 shown in block form in FIG. 2. Manufacturing assembly 400 may be a depiction of manufacturing assembly 304 or manufacturing assembly 306 of FIG. 3.

Manufacturing assembly 400 may include movement system 402, movement system 404, base 406, plurality of autonomous functional components 408, and plurality of autonomous clamping components 410. Movement system 402 and movement system 404 may move base 406 and plurality of autonomous functional components 408 in at least one dimension. Plurality of autonomous clamping components 410 may move relative to base 406. Plurality of autonomous functional components 408 may move relative to base 406.

Figure 5:
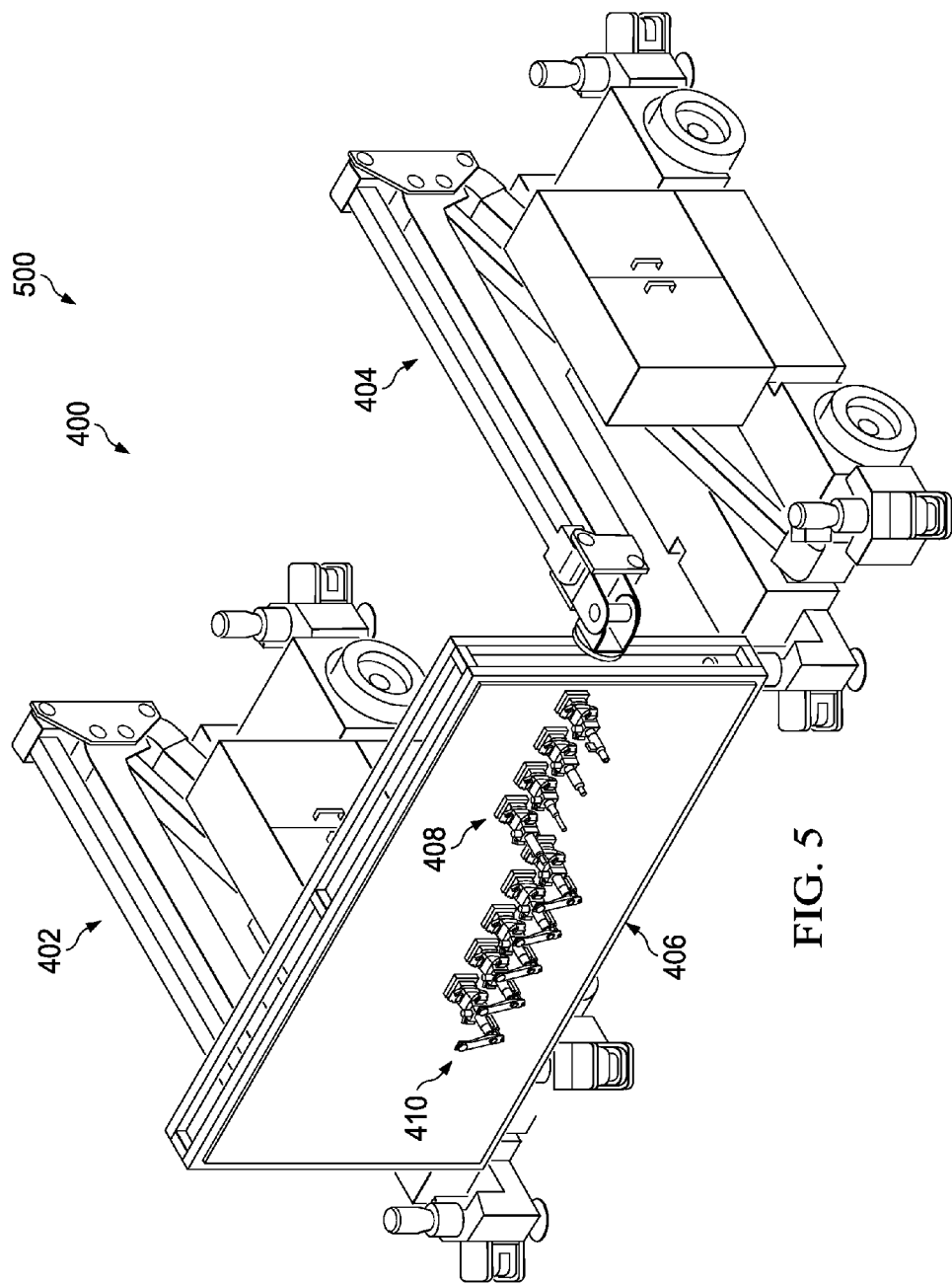
FIG. 5 is an illustration of a manufacturing assembly in accordance with an illustrative embodiment.

Turning now to FIG. 5, an illustration of a manufacturing assembly is depicted in accordance with an illustrative embodiment. View 500 may be a view of manufacturing assembly 400 after moving movement system 402 and movement system 404. View 500 may be a view of manufacturing assembly 400 such that each of movement system 402, movement system 404, and base 406 face sideways.

Manufacturing assembly 400 as positioned in FIG. 4 may work on a horizontal workpiece. For example, manufacturing assembly 400 as shown in FIG. 4 may work on a surface substantially parallel to the ground. Manufacturing assembly 400 as positioned in view 500 may be used to work on a vertical workpiece. For example, manufacturing assembly 400 as shown in FIG. 5 may be used to work on a surface substantially perpendicular to the ground. Base 406 could potentially be held at any angle relative to the ground. Further, although two movement systems are depicted, base 406 could be held and moved by any number of movement systems.

Turning now to FIGS. 6-13, illustrations of a manufacturing assembly operating within a manufacturing environment are depicted in accordance with an illustrative embodiment. Specifically, FIGS. 6-13 are illustrations of manufacturing assembly 400 of FIG. 4 with movement system 402 and movement system 404 removed for clarity.

Figure 6:
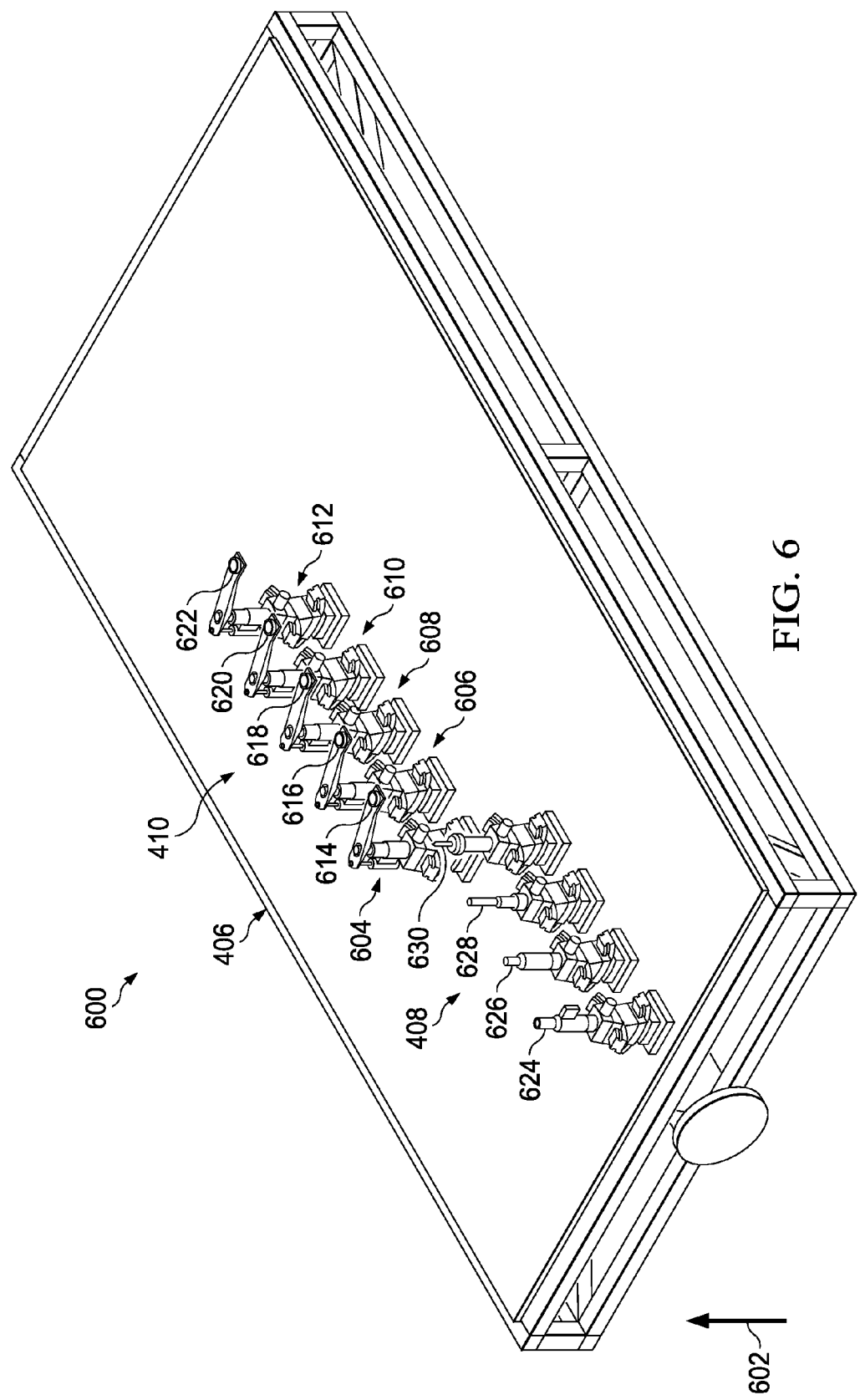
FIG. 6 is an illustration of a manufacturing assembly operating within a manufacturing environment in accordance with an illustrative embodiment.

In view 600 of FIG. 6, plurality of autonomous functional components 408 and plurality of autonomous clamping components 410 may work on a workpiece (not depicted). The workpiece may be positioned parallel to base 406. As a result, plurality of autonomous functional components 408 may perform functions in direction 602 relative to base 406 to access the workpiece. Further, portions of plurality of autonomous functional components 408 may be moved in direction 602 relative to base 406 towards workpiece (not depicted) to perform functions on the workpiece. Plurality of autonomous clamping components 410 may include clamping component 604, clamping component 606, clamping component 608, clamping component 610, and clamping component 612. Clamping component 604 may be positioned such that operating envelope 614 is positioned relative to a first location of a workpiece (not depicted). Clamping component 606 may be positioned such that operating envelope 616 is positioned relative to a second location of a workpiece (not depicted). Clamping component 608 may be positioned such that operating envelope 618 is positioned relative to a third location of a workpiece (not depicted). Clamping component 610 may be positioned such that operating envelope 620 is positioned relative to a fourth location of a workpiece (not depicted). Clamping component 612 may be positioned such that operating envelope 622 is positioned relative to a fifth location of a workpiece (not depicted).

Plurality of autonomous functional components 408 may include functional component 624, functional component 626, functional component 628, and functional component 630. Plurality of autonomous clamping components 410 includes one more clamping components than functional components in plurality of autonomous functional components 408. As depicted, plurality of autonomous clamping components 410 may have five clamping components while plurality of autonomous functional components 408 may have four functional components. Plurality of autonomous clamping components 410 may have one more clamping component than the number of functional components in plurality of autonomous functional components 408 such that performing a function may not wait on moving a clamping component of plurality of autonomous clamping components 410.

Plurality of autonomous clamping components 410 may apply pressure to the workpiece (not depicted). In some illustrative examples, plurality of autonomous clamping components 410 may provide clamping independently of other tools. In some illustrative examples, plurality of autonomous clamping components 410 may provide clamping in conjunction with other tools. For example, a number of tools may provide counter pressure to counteract pressure applied by plurality of autonomous clamping components 410. In these illustrative examples, plurality of autonomous clamping components 410 may apply pressure to a first side of the workpiece (not depicted) while the number of tools may provide counter pressure on a second, opposite side of the workpiece. By applying pressure to the workpiece (not depicted), plurality of autonomous clamping components 410 may form a number of operating envelopes through which plurality of autonomous functional components 408 may work.

Figure 7:
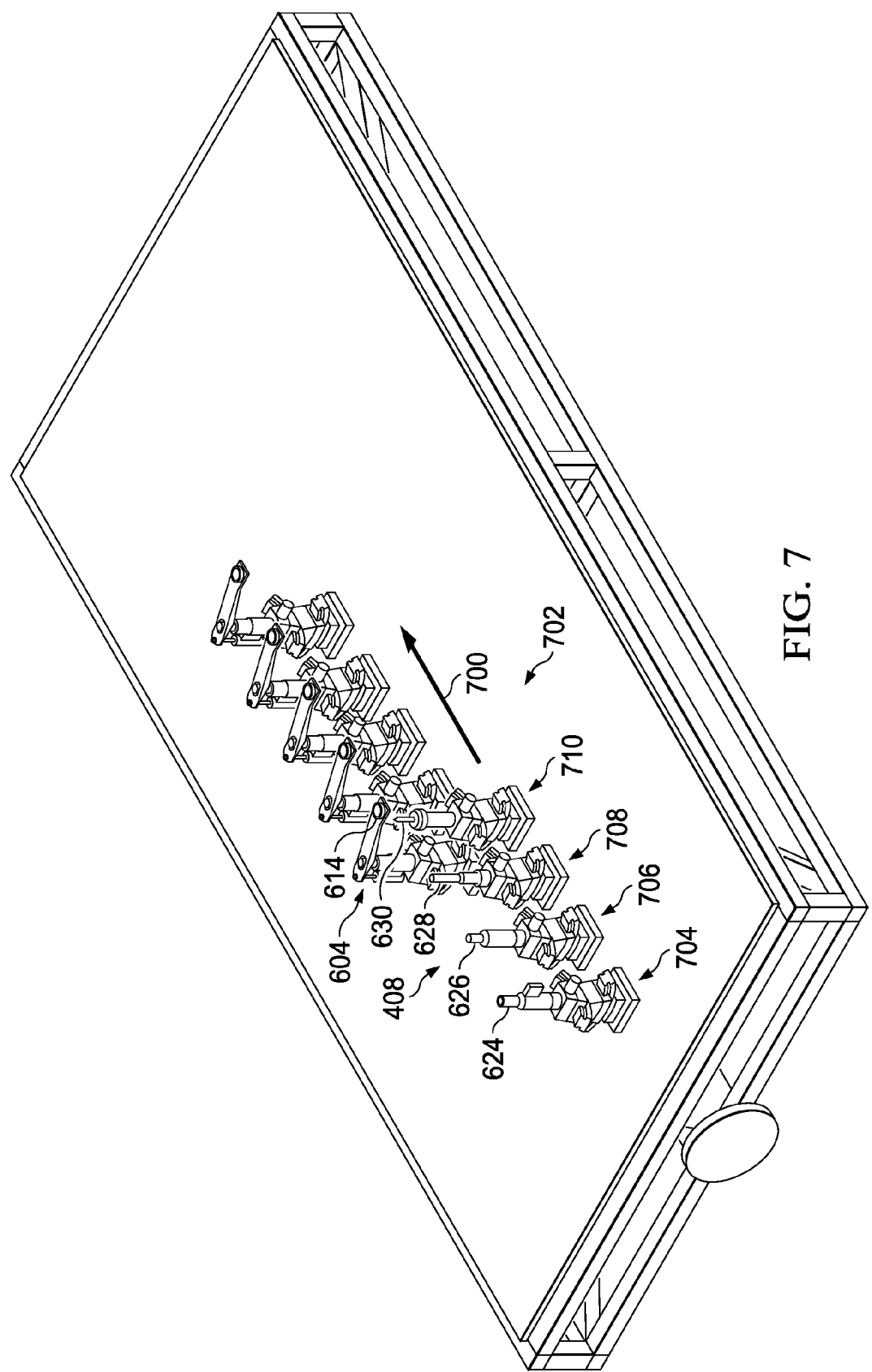
FIG. 7 is an illustration of a manufacturing assembly operating within a manufacturing environment in accordance with an illustrative embodiment.

As depicted in FIG. 7, each of plurality of autonomous functional components 408 may move in direction 700. Plurality of autonomous movement systems 702 may move plurality of autonomous functional components 408 in direction 700. Plurality of autonomous movement systems 702 may include movement system 704 associated with functional component 624, movement system 706 associated with functional component 626, movement system 708 associated with functional component 628, and movement system 710 associated with functional component 630.

By moving in direction 700, functional component 630 may be associated with operating envelope 614 of clamping component 604. Functional component 630 may perform a function on the workpiece (not depicted) through operating envelope 614. Functional component 630 may perform the function on a first location of the workpiece (not depicted).

Figure 8:
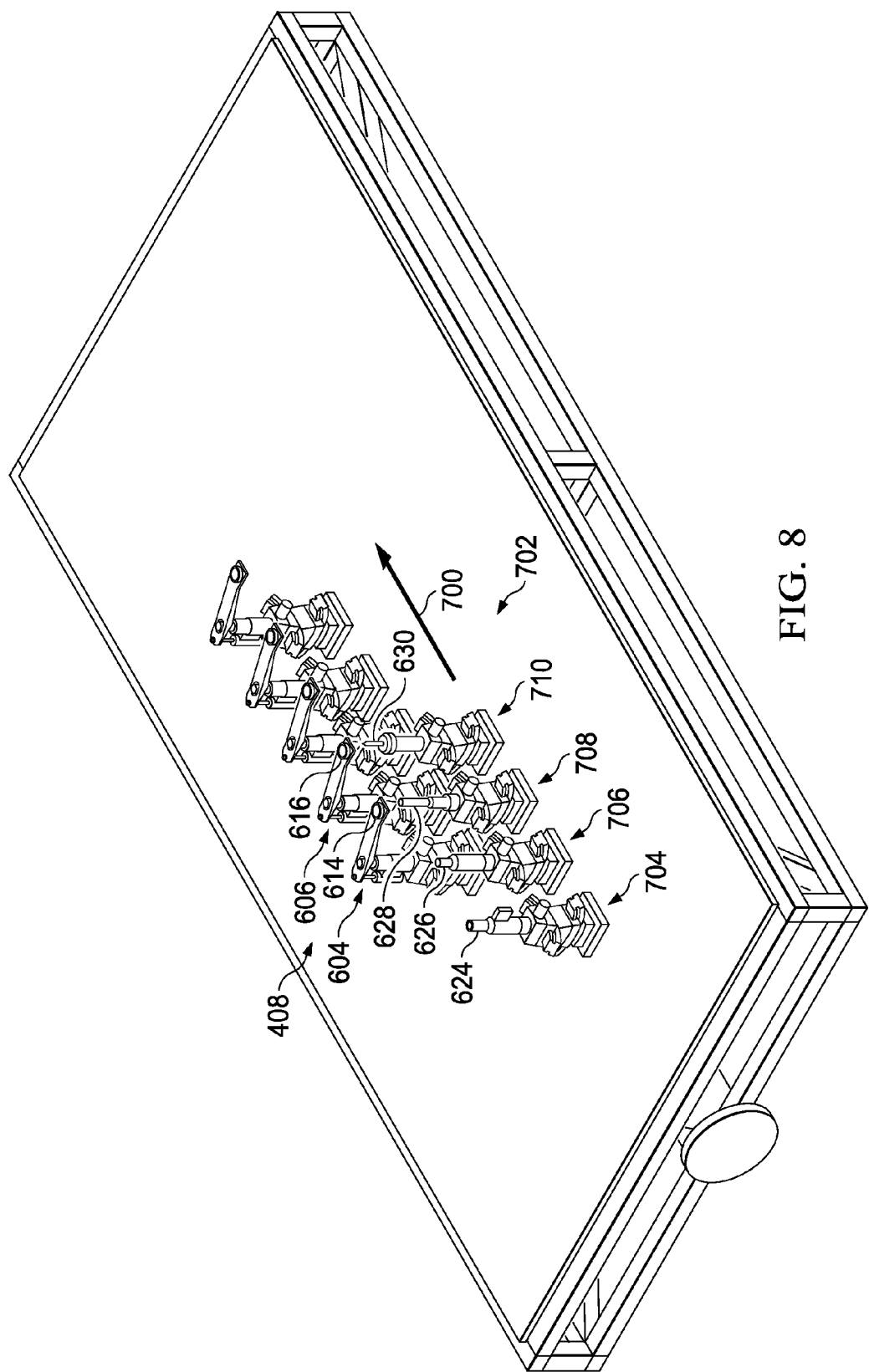
FIG. 8 is an illustration of a manufacturing assembly operating within a manufacturing environment in accordance with an illustrative embodiment.

As depicted in FIG. 8, each of plurality of autonomous functional components 408 may move in direction 700. Plurality of autonomous movement systems 702 may move plurality of autonomous functional components 408 in direction 700. By moving in direction 700, functional component 630 may be associated with operating envelope 616 of clamping component 606. By moving in direction 700, functional component 628 may be associated with operating envelope 614 of clamping component 604. Functional component 630 may perform a function on the workpiece (not depicted) through operating envelope 616. Functional component 630 may perform the function on the second location of the workpiece (not depicted). Functional component 628 may perform a function on the workpiece (not depicted) through operating envelope 614. Functional component 628 may perform the function on the first location of the workpiece (not depicted). Functional component 628 and functional component 630 may perform their respective functions substantially simultaneously.

Figure 9:
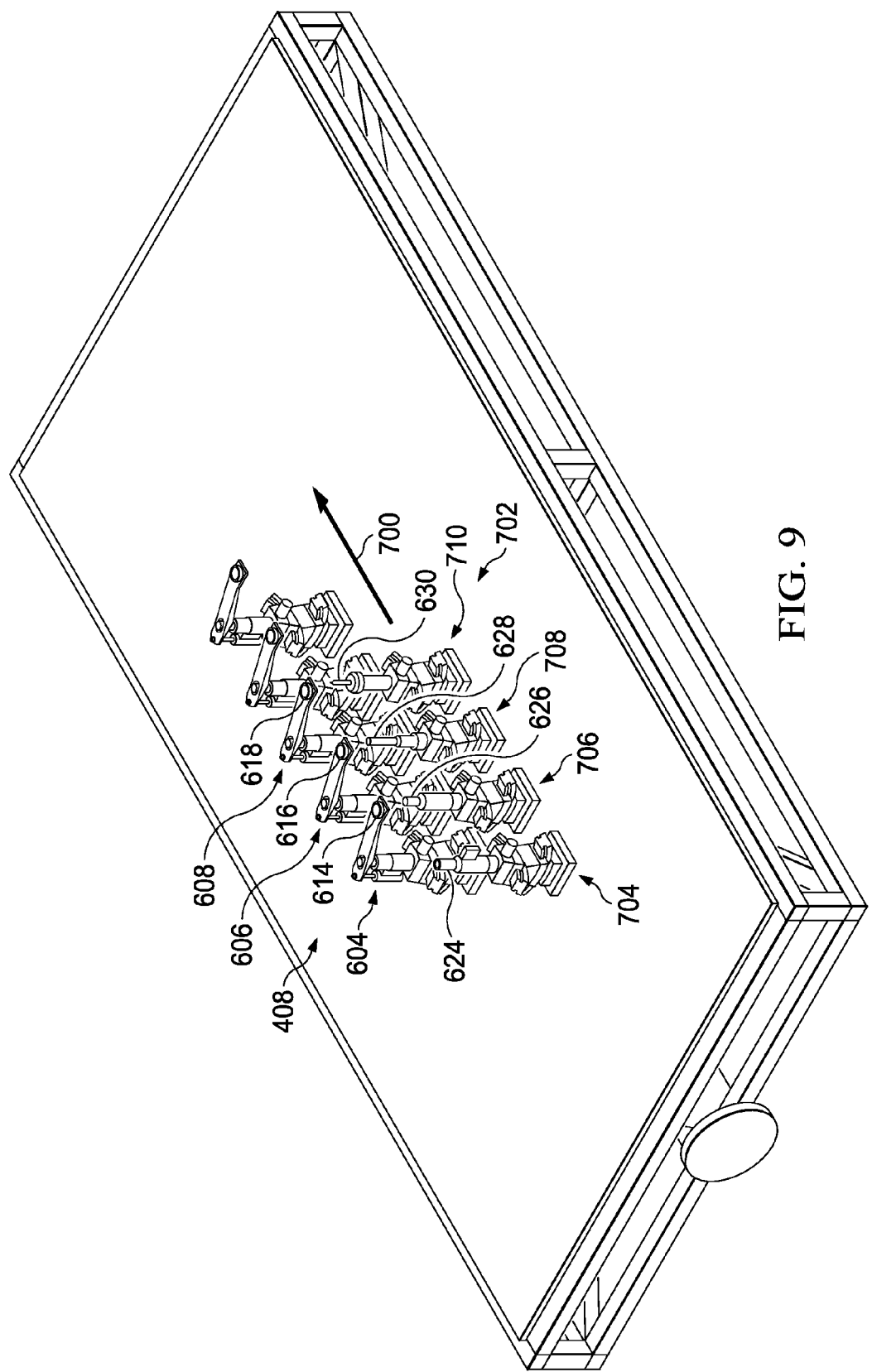
FIG. 9 is an illustration of a manufacturing assembly operating within a manufacturing environment in accordance with an illustrative embodiment.

As depicted in FIG. 9, each of plurality of autonomous functional components 408 may move in direction 700. Plurality of autonomous movement systems 702 may move plurality of autonomous functional components 408 in direction 700. By moving in direction 700, functional component 630 may be associated with operating envelope 618 of clamping component 608. By moving in direction 700, functional component 628 may be associated with operating envelope 616 of clamping component 606. By moving in direction 700, functional component 626 may be associated with operating envelope 614 of clamping component 604.

Functional component 630 may perform a function on the workpiece (not depicted) through operating envelope 618. Functional component 630 may perform the function on the third location of the workpiece (not depicted). Functional component 628 may perform a function on the workpiece (not depicted) through operating envelope 616. Functional component 628 may perform the function on the second location of the workpiece (not depicted). Functional component 626 may perform a function on the workpiece (not depicted) through operating envelope 614. Functional component 626 may perform the function on the first location of the workpiece (not depicted). Functional component 626, functional component 628, and functional component 630 may perform their respective functions substantially simultaneously.

Figure 10:
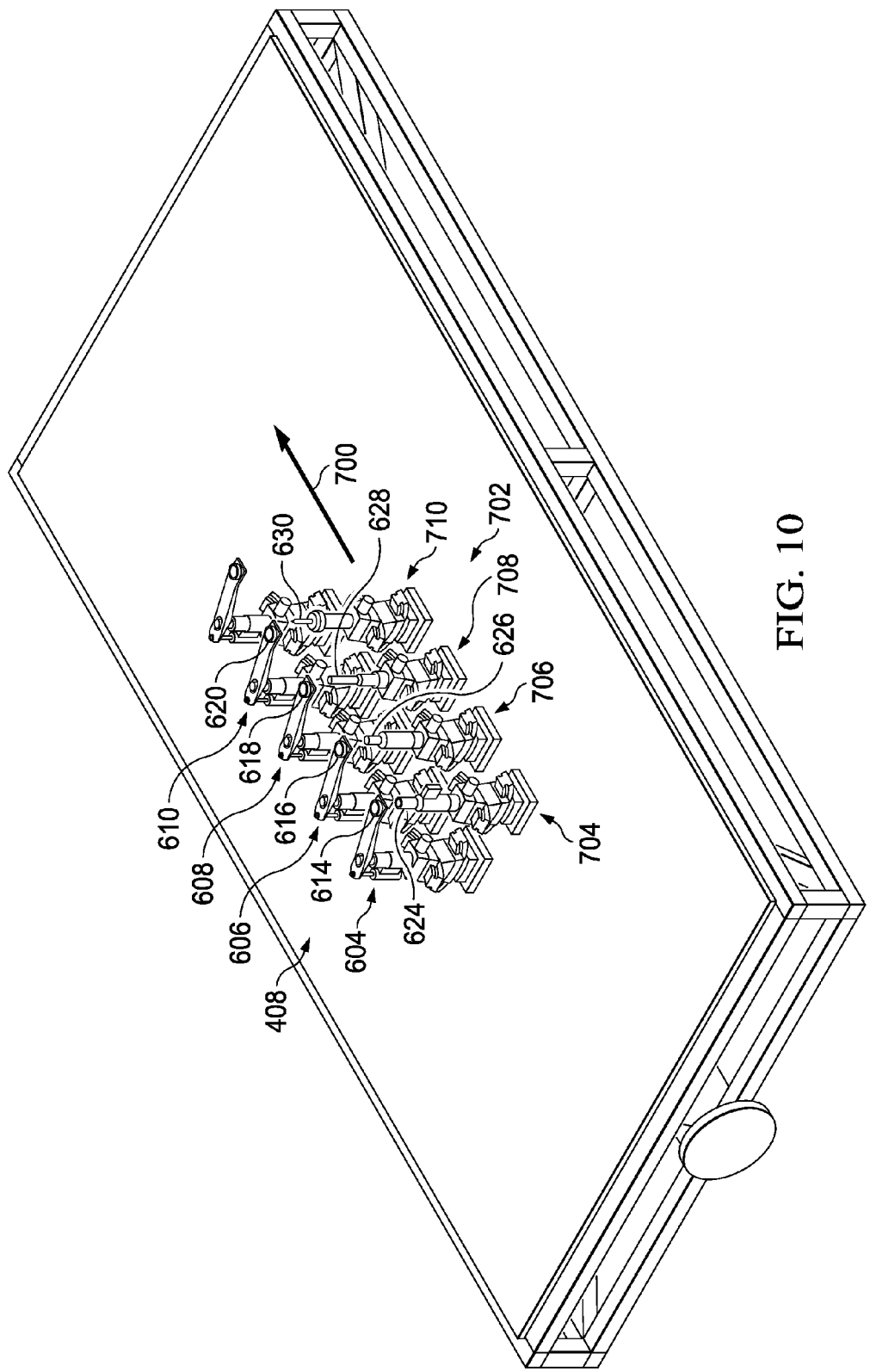
FIG. 10 is an illustration of a manufacturing assembly operating within a manufacturing environment in accordance with an illustrative embodiment.

As depicted in FIG. 10, each of plurality of autonomous functional components 408 may move in direction 700. Plurality of autonomous movement systems 702 may move plurality of autonomous functional components 408 in direction 700. By moving in direction 700, functional component 630 may be associated with operating envelope 620 of clamping component 610. By moving in direction 700, functional component 628 may be associated with operating envelope 618 of clamping component 608. By moving in direction 700, functional component 626 may be associated with operating envelope 616 of clamping component 606. By moving in direction 700, functional component 624 may be associated with operating envelope 614 of clamping component 604.

Functional component 630 may perform a function on the workpiece (not depicted) through operating envelope 620. Functional component 630 may perform the function on the fourth location of the workpiece (not depicted). Functional component 628 may perform a function on the workpiece (not depicted) through operating envelope 618. Functional component 628 may perform the function on the third location of the workpiece (not depicted). Functional component 626 may perform a function on the workpiece (not depicted) through operating envelope 616. Functional component 626 may perform the function on the second location of the workpiece (not depicted). Functional component 624 may perform a function on the workpiece (not depicted) through operating envelope 614. Functional component 624 may perform the function on the first location of the workpiece (not depicted). Functional component 624, functional component 626, functional component 628, and functional component 630 may perform their respective functions substantially simultaneously. First location, second location, third location, and fourth location may be referred to as a first plurality of locations. In some illustrative examples, a subset of the first location, second location, third location, and fourth location may be referred to as a first plurality of locations. For example, the first location and the second location may be referred to as a first plurality of locations.

Figure 11:
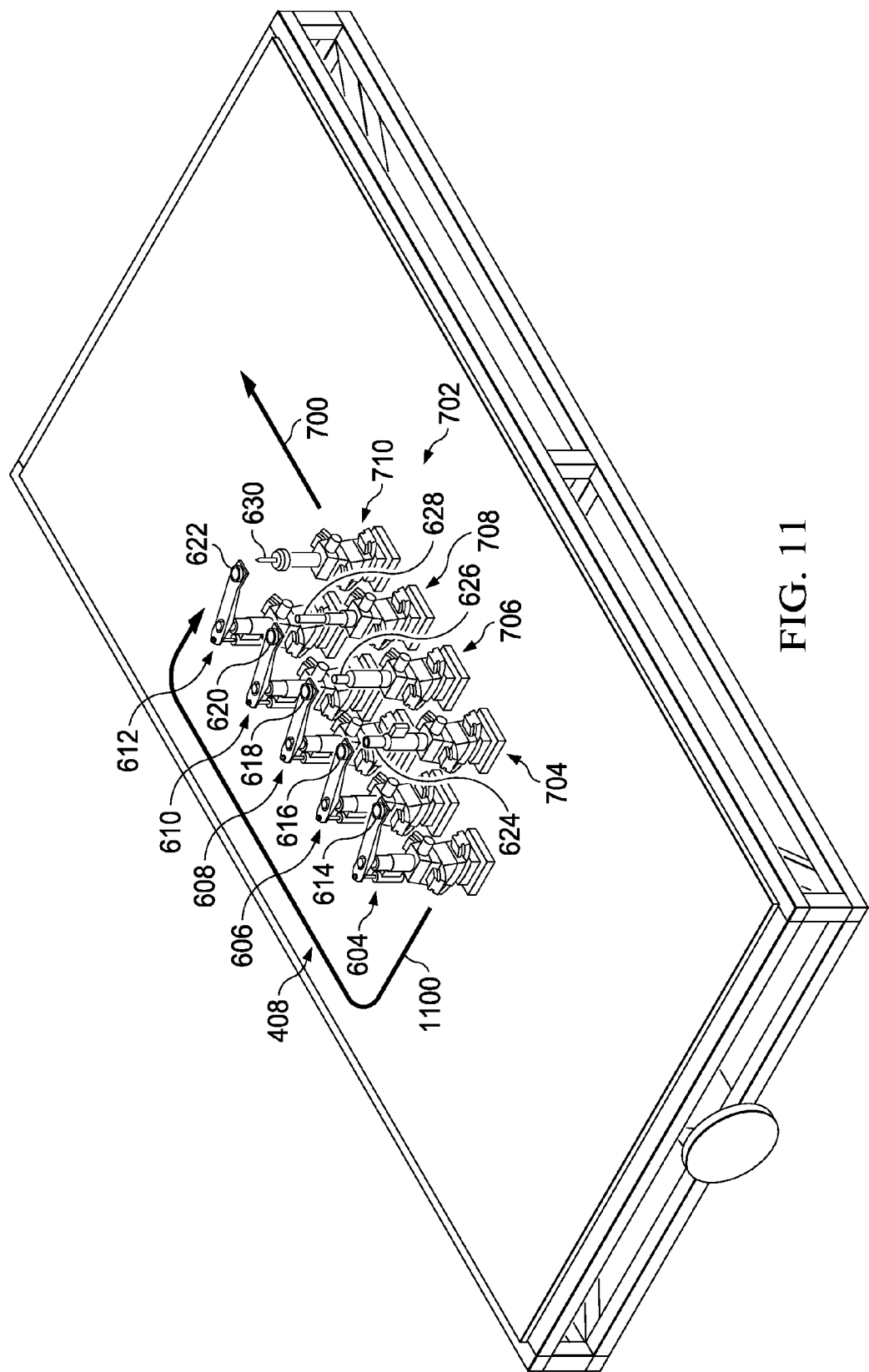
FIG. 11 is an illustration of a manufacturing assembly operating within a manufacturing environment in accordance with an illustrative embodiment.

As depicted in FIG. 11, each of plurality of autonomous functional components 408 may move in direction 700. Plurality of autonomous movement systems 702 may move plurality of autonomous functional components 408 in direction 700. By moving in direction 700, functional component 630 may be associated with operating envelope 622 of clamping component 612. By moving in direction 700, functional component 628 may be associated with operating envelope 620 of clamping component 610. By moving in direction 700, functional component 626 may be associated with operating envelope 618 of clamping component 608. By moving in direction 700, functional component 624 may be associated with operating envelope 616 of clamping component 606.

Functional component 630 may perform a function on the workpiece (not depicted) through operating envelope 622. Functional component 630 may perform the function on the fifth location of the workpiece (not depicted). Functional component 628 may perform a function on the workpiece (not depicted) through operating envelope 620. Functional component 628 may perform the function on the fourth location of the workpiece (not depicted). Functional component 626 may perform a function on the workpiece (not depicted) through operating envelope 618. Functional component 626 may perform the function on the third location of the workpiece (not depicted). Functional component 624 may perform a function on the workpiece (not depicted) through operating envelope 616. Functional component 624 may perform the function on the second location of the workpiece (not depicted). Functional component 624, functional component 626, functional component 628, and functional component 630 may perform their respective functions substantially simultaneously. Second location, third location, fourth location, and fifth location may be referred to as a second plurality of locations. In some illustrative examples, a subset of the second location, third location, fourth location, and fifth location may be referred to as a second plurality of locations. For example, the fourth location and the fifth location may be referred to as a second plurality of locations.

As further depicted in FIG. 11, clamping component 604 and operating envelope 614 may not be associated with a functional component. Clamping component 604 may move in direction 1100. By moving in direction 1100, clamping component 604 may be moved adjacent to clamping component 612. Clamping component 604 may be associated with a sixth location on the workpiece (not depicted).

Figure 12:
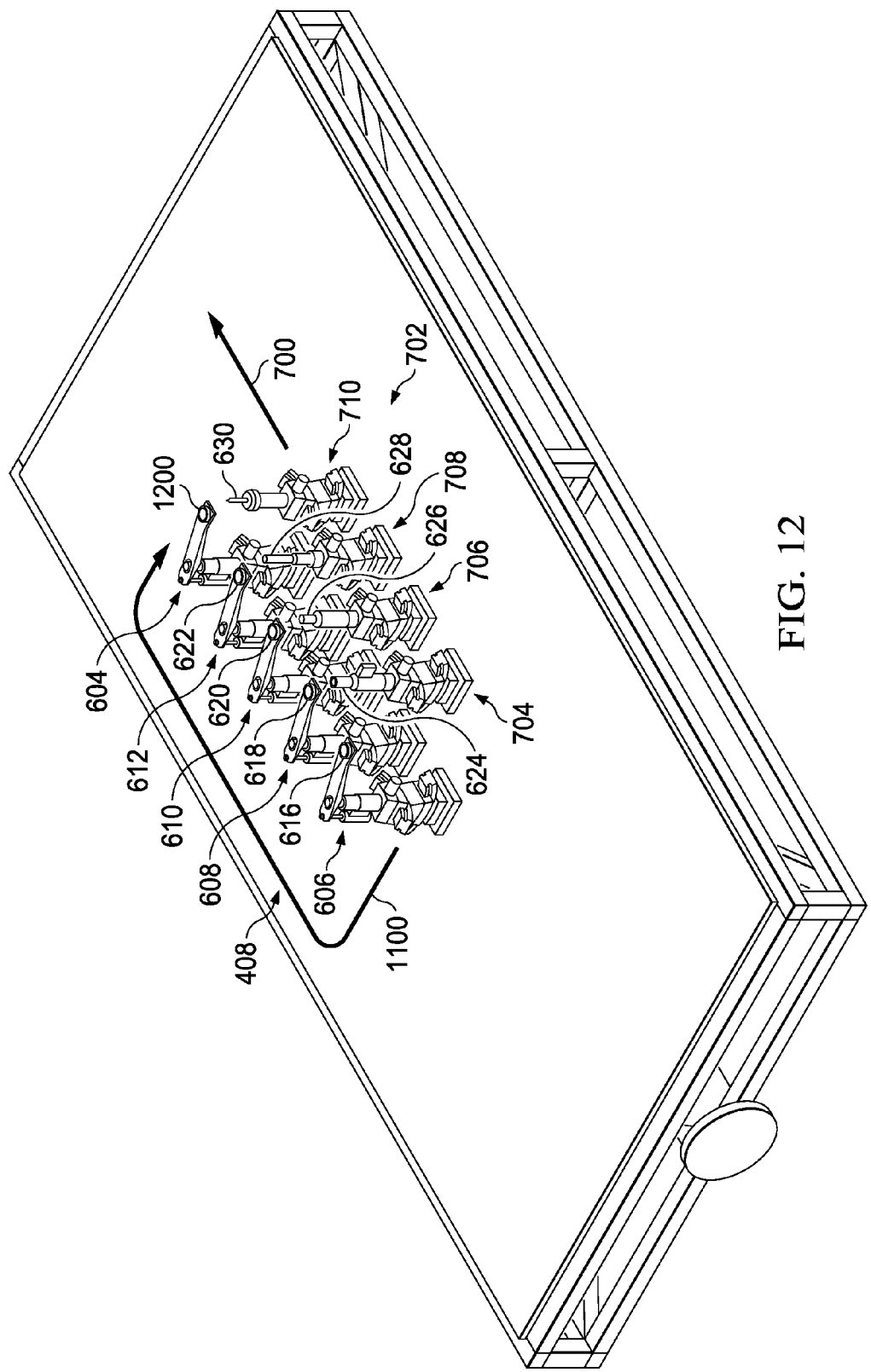
FIG. 12 is an illustration of a manufacturing assembly operating within a manufacturing environment in accordance with an illustrative embodiment.

As depicted in FIG. 12, each of plurality of autonomous functional components 408 may move in direction 700. Plurality of autonomous movement systems 702 may move plurality of autonomous functional components 408 in direction 700. By moving in direction 700, functional component 630 may be associated with operating envelope 1200 formed by clamping component 604 relative to the workpiece. By moving in direction 700, functional component 628 may be associated with operating envelope 622 of clamping component 612. By moving in direction 700, functional component 626 may be associated with operating envelope 620 of clamping component 610. By moving in direction 700, functional component 624 may be associated with operating envelope 618 of clamping component 608.

Functional component 630 may perform a function on the workpiece (not depicted) through operating envelope 1200. Functional component 630 may perform the function on the sixth location of the workpiece (not depicted). Functional component 628 may perform a function on the workpiece (not depicted) through operating envelope 622. Functional component 628 may perform the function on the fifth location of the workpiece (not depicted). Functional component 626 may perform a function on the workpiece (not depicted) through operating envelope 620. Functional component 626 may perform the function on the fourth location of the workpiece (not depicted). Functional component 624 may perform a function on the workpiece (not depicted)

through operating envelope 618. Functional component 624 may perform the function on the third location of the workpiece (not depicted).

Functional component 624, functional component 626, functional component 628, and functional component 630 may perform their respective functions substantially simultaneously. Third location, fourth location, fifth location, and sixth location may be referred to as a third plurality of locations. In some illustrative examples, a subset of the third location, fourth location, fifth location, and sixth location may be referred to as a third plurality of locations. For example, the fifth location and the sixth location may be referred to as a third plurality of locations.

As further depicted in FIG. 12, clamping component 606 and operating envelope 616 may not be associated with a functional component. Clamping component 606 may move in direction 1100. By moving in direction 1100, clamping component 606 may be moved adjacent to clamping component 604. Clamping component 606 may be associated with a seventh location on the workpiece (not depicted).

Figure 13:
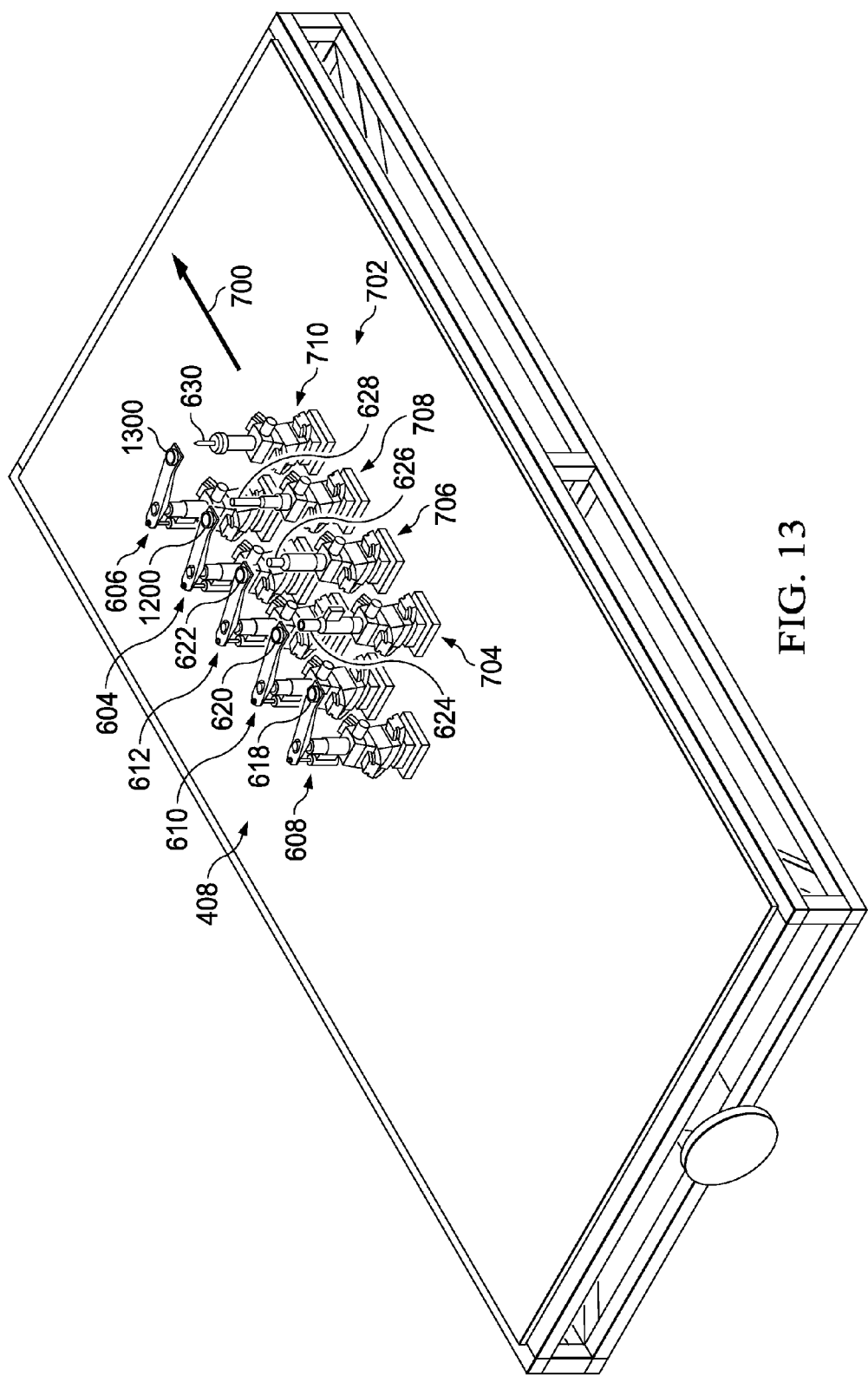
FIG. 13 is an illustration of a manufacturing assembly operating within a manufacturing environment in accordance with an illustrative embodiment.

As depicted in FIG. 13, each of plurality of autonomous functional components 408 may move in direction 700. Plurality of autonomous movement systems 702 may move plurality of autonomous functional components 408 in direction 700. By moving in direction 700, functional component 630 may be associated with operating envelope 1300 formed by clamping component 606 relative to the workpiece. By moving in direction 700, functional component 628 may be associated with operating envelope 1200 of clamping component 604. By moving in direction 700, functional component 626 may be associated with operating envelope 622 of clamping component 612. By moving in direction 700, functional component 624 may be associated with operating envelope 620 of clamping component 610.

Functional component 630 may perform a function on the workpiece (not depicted) through operating envelope 1300. Functional component 630 may perform the function on the seventh location of the workpiece (not depicted). Functional component 628 may perform a function on the workpiece (not depicted) through operating envelope 1200. Functional component 628 may perform the function on the sixth location of the workpiece (not depicted). Functional component 626 may perform a function on the workpiece (not depicted) through operating envelope 622. Functional component 626 may perform the function on the fifth location of the workpiece (not depicted). Functional component 624 may perform a function on the workpiece (not depicted) through operating envelope 620. Functional component 624 may perform the function on the fourth location of the workpiece (not depicted). Functional component 624, functional component 626, functional component 628, and functional component 630 may perform their respective functions substantially simultaneously.

Figure 14:
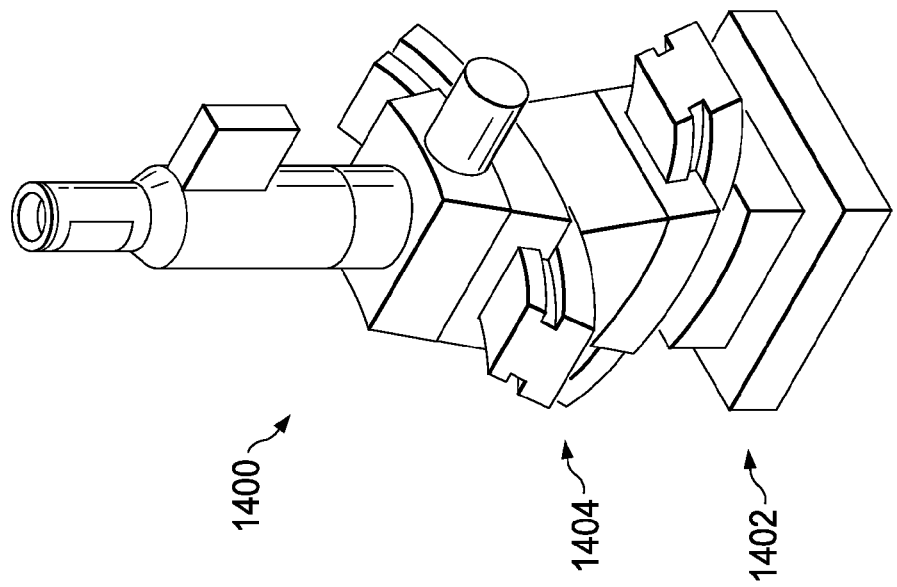
FIG. 14 is an illustration of a functional component in accordance with an illustrative embodiment.

Turning now to FIG. 14, an illustration of a functional component is depicted in accordance with an illustrative embodiment. Functional component 1400 may be a physical implementation of first functional component 216 shown in block form in FIG. 2.

Functional component 1400 is associated with movement system 1402. Additionally, functional component 1400 is associated with adjustment system 1404. Adjustment system 1404 may allow for functional component 1400 to move the position of functional component 1400 relative to movement system 1402. Adjustment system 1404 may move functional component 1400 in at least one degree of freedom. In some illustrative examples, adjustment system 1404 may move functional component 1400 in at least one degree of translation or one degree of rotation. In some illustrative examples, adjustment system 1404 may be a multi-dimensional adjustment system. As depicted, movement system 1402 and adjustment system 1404 may be configured to move functional component 1400 in at least four degrees of freedom. In other illustrative examples, movement system 1402 and adjustment system 1404 may be configured to move functional component 1400 in any desirable number of degrees of freedom. For example, movement system 1402 and adjustment system 1404 may be configured to move functional component 1400 in three degrees of translation and three degrees of rotation.

Figure 15:
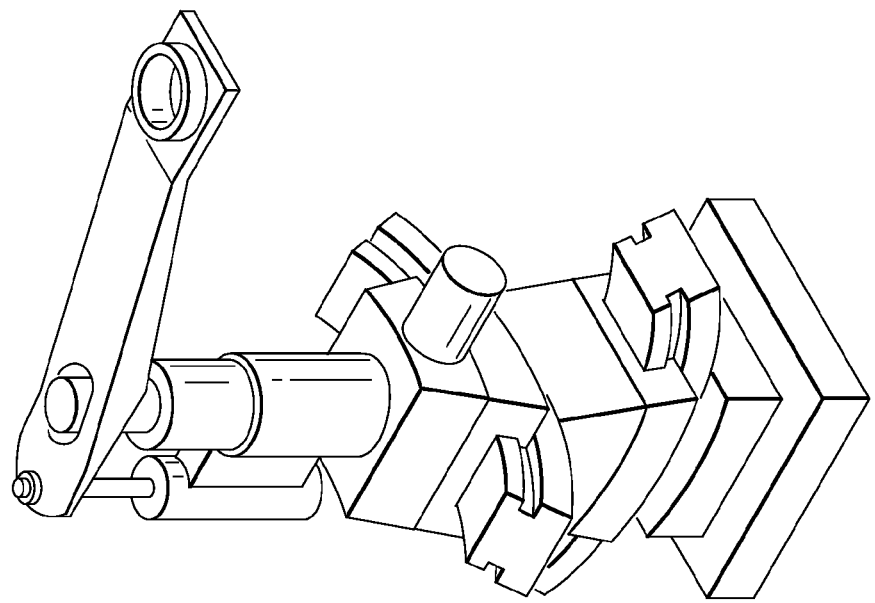
FIG. 15 is an illustration of a clamping component in accordance with an illustrative embodiment.

Turning now to FIG. 15, an illustration of a clamping component is depicted in accordance with an illustrative embodiment. Clamping component 1500 may be a physical implementation of a clamping component of plurality of autonomous clamping components 236 shown in block form in FIG. 2.

Clamping component 1500 is associated with movement system 1502. Additionally, clamping component 1500 is associated with adjustment system 1504. Adjustment system 1504 may allow for clamping component 1500 to move the position of clamping component 1500 relative to movement system 1502.

Adjustment system 1504 may move clamping component 1500 in at least one degree of freedom. In some illustrative examples, adjustment system 1504 may move clamping component 1500 in at least one degree of translation or one degree of rotation. In some illustrative examples, adjustment system 1504 may be a multi-dimensional adjustment system. As depicted, movement system 1502 and adjustment system 1504 may be configured to move clamping component 1500 in at least four degrees of freedom. In other illustrative examples, movement system 1502 and adjustment system 1504 may be configured to move clamping component 1500 in any desirable number of degrees of freedom. For example, movement system 1502 and adjustment system 1504 may be configured to move clamping component 1500 in three degrees of translation and three degrees of rotation.

Clamping component 1500 may apply pressure to a workpiece (not depicted). In some illustrative examples, clamping component 1500 may provide clamping independently of other tools. In some illustrative examples, clamping component 1500 may provide clamping in conjunction with another tool. For example, a number of tools may provide counter pressure to counteract pressure applied by clamping component 1500. In these illustrative examples, clamping component 1500 may apply pressure to a first side of the workpiece (not depicted) while the number of tools may provide counter pressure on a second, opposite side of the workpiece. By applying pressure to the workpiece (not depicted), clamping component 1500 may form an operating envelope through which a number of functional components may work.

Figure 16:
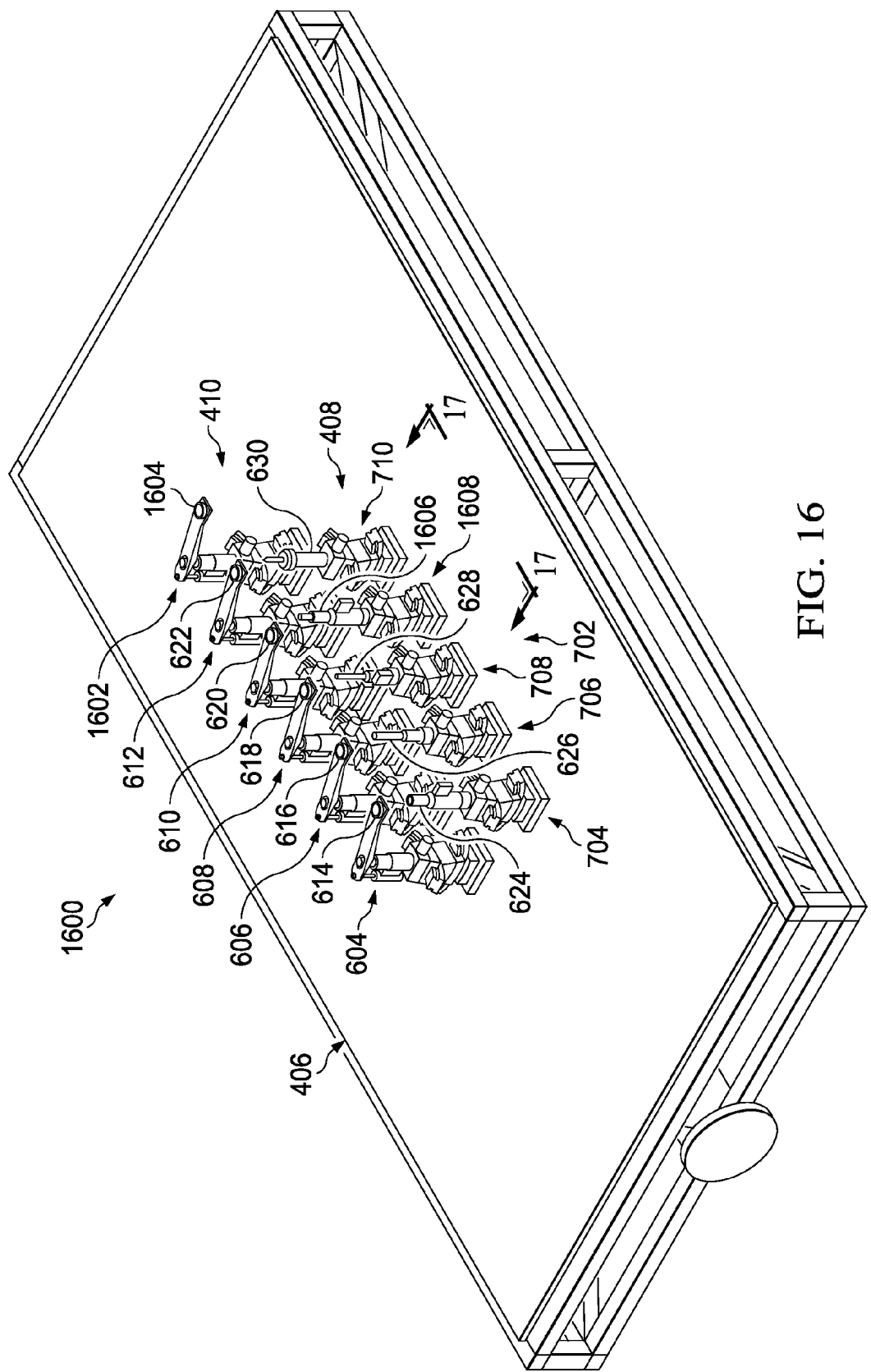
FIG. 16 is an illustration of a manufacturing assembly operating within a manufacturing environment in accordance with an illustrative embodiment.

Turning now to FIG. 16, an illustration of a manufacturing assembly operating within a manufacturing environment is depicted in accordance with an illustrative embodiment. In view 1600 of FIG. 16, plurality of autonomous functional components 408 and plurality of autonomous clamping components 410 may work on a workpiece positioned parallel to base 406. In view 1600, at least one of plurality of autonomous functional components 408 or plurality of autonomous clamping components 410 may include additional components. As depicted, plurality of autonomous clamping components 410 may include clamping component 1602 as well as clamping component 604, clamping component 606, clamping component 608, clamping component 610, and clamping component 612. Clamping component 604 may be positioned such that operating envelope 614 is positioned relative to a first location of a workpiece (not depicted). Clamping component 606 may be positioned such that operating envelope 616 is positioned relative to a second location of a workpiece (not depicted). Clamping component 608 may be positioned such that operating envelope 618 is positioned relative to a third location of a workpiece (not depicted). Clamping component 610 may be positioned such that operating envelope 620 is positioned relative to a fourth location of a workpiece (not depicted). Clamping component 612 may be positioned such that operating envelope 622 is positioned relative to a fifth location of a workpiece (not depicted). Clamping component 1602 may be positioned such that operating envelope 1604 is positioned relative to a sixth location of a workpiece (not depicted).

Plurality of autonomous functional components 408 may include functional component 1606 as well as functional component 624, functional component 626, functional component 628, and functional component 630. As depicted, functional component 1606 may be positioned between functional component 628 and functional component 630. Functional component 1606 may be an optional functional component. For example, functional component 1606 may provide a support function for at least one of functional component 624, functional component 626, functional component 628, or functional component 630. In some illustrative examples, functional component 1606 may support a drilling function. Functional component 1606 may be associated with movement system 1608.

Plurality of autonomous clamping components 410 includes one more clamping component than functional components in plurality of autonomous functional components 408. As depicted, plurality of autonomous clamping components 410 may have six clamping components while plurality of autonomous functional components 408 may have five functional components.

Figure 17:
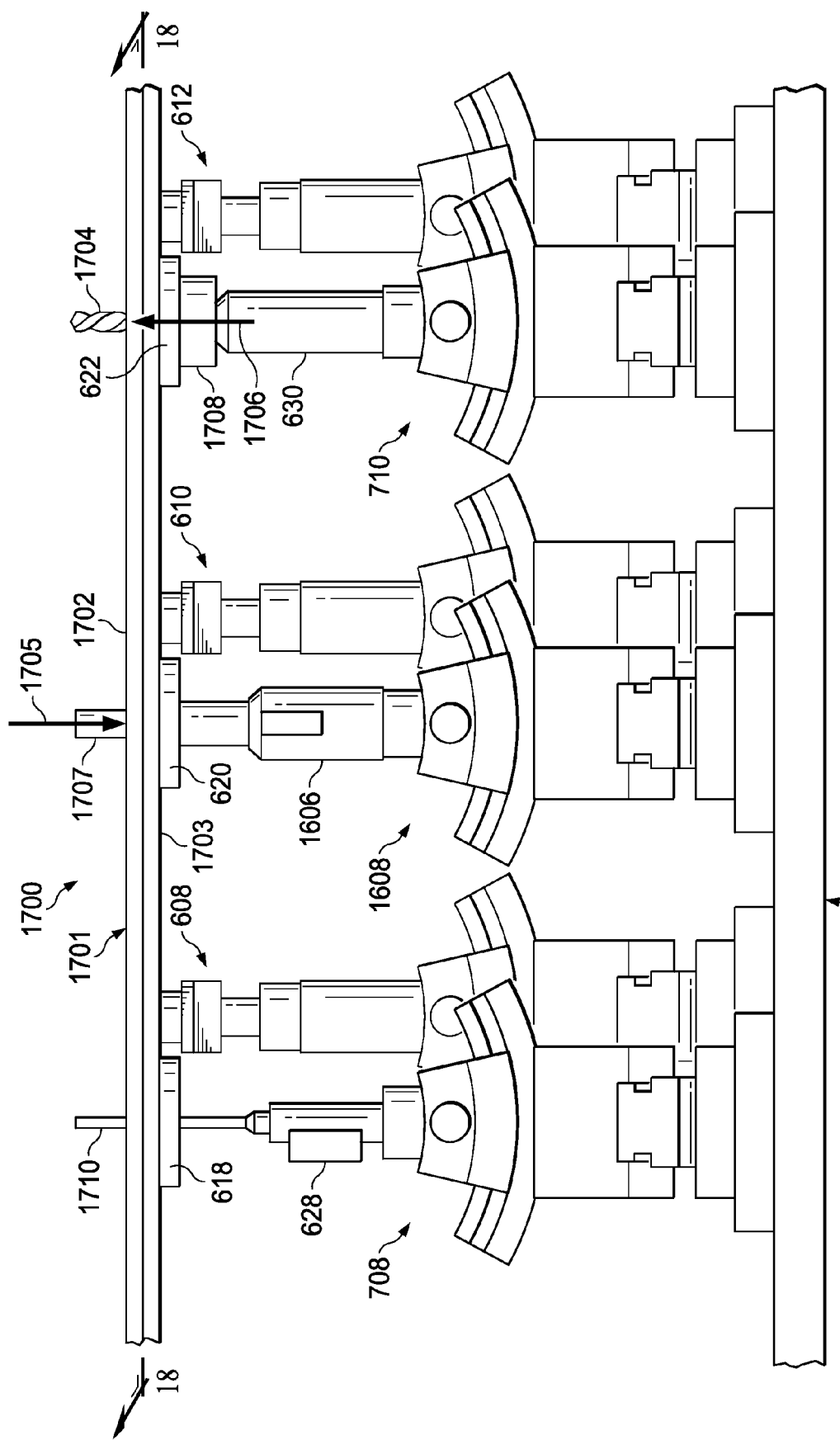
FIG. 17 is an illustration of a side view of a manufacturing assembly operating within a manufacturing environment in accordance with an illustrative embodiment.

Turning now to FIG. 17, an illustration of a side view of a manufacturing assembly operating within a manufacturing environment is depicted in accordance with an illustrative embodiment. View 1700 may be a view of a number of plurality of autonomous functional components 408 and a number of plurality of autonomous clamping components 410 working on a workpiece within section 17-17 of FIG. 16. View 1700 includes workpiece 1701. Workpiece 1701 may include object 1702 and object 1703. As depicted, object 1702 and object 1703 may be joined by fasteners using plurality of autonomous functional components 408. Functional component 630 may drill locations of workpiece 1701 using drill bit 1704. Functional component 628 may inspect the drilled holes in workpiece 1701.

Functional component 1606 may provide a support function. Functional component 1606 may provide force 1705 opposite the direction of force 1706 applied on workpiece 1701 by drill bit 1704. Functional component 1606 may provide force 1705 resistant to functional component 630. In some illustrative examples, functional component 1606 may provide a clamping force. In some illustrative examples, functional component 1606 may provide force 1705 equal to or greater than force 1706 provided by drill bit 1704. Force 1705 provided by functional component 1606 may prevent changing the shape or bowing of base 406. Force 1705 provided by functional component 1606 may prevent changing the shape or bowing of workpiece 1701.

Functional component 1606 may include temporary fastener 1707. Temporary fastener 1707 may take the form of a cleco fastener, a sleeve type fastener, a threaded temporary fastener, a spring-type temporary fastener, or some other desirable type of temporary fastener.

Temporary fastener 1707 may be inserted and secured in workpiece 1701 while temporary fastener 1707 is associated with functional component 1606 and while functional component 1606 is associated with base 406. In some illustrative examples, temporary fastener 1707 may be inserted and secured in a workpiece and may remain in the workpiece as functional component 1606 moves away from temporary fastener 1707.

As depicted, functional component 630 may optionally include interface 1708. Interface 1708 may support functional component 630 during operation of functional component 630. In some illustrative examples, interface 1708 may connect functional component 630 to clamping component 612. In some illustrative examples, interface 1708 may take the form of at least one of a bush interface, a locking mechanism, or some other desirable interface. Interface 1708 may align drill bit 1704 relative to workpiece 1701 in at least one dimension. Interface 1708 may align drill bit 1704 relative to operating envelope 622. As depicted, drill bit 1704 may operate through operating envelope 622. In some illustrative examples, at least a portion of interface 1708 may enter operating envelope 622.

As depicted, temporary fastener 1707 may operate through operating envelope 620 of clamping component 610. Probe 1710 may operate through operating envelope 618 of clamping component 608.

Figure 18:
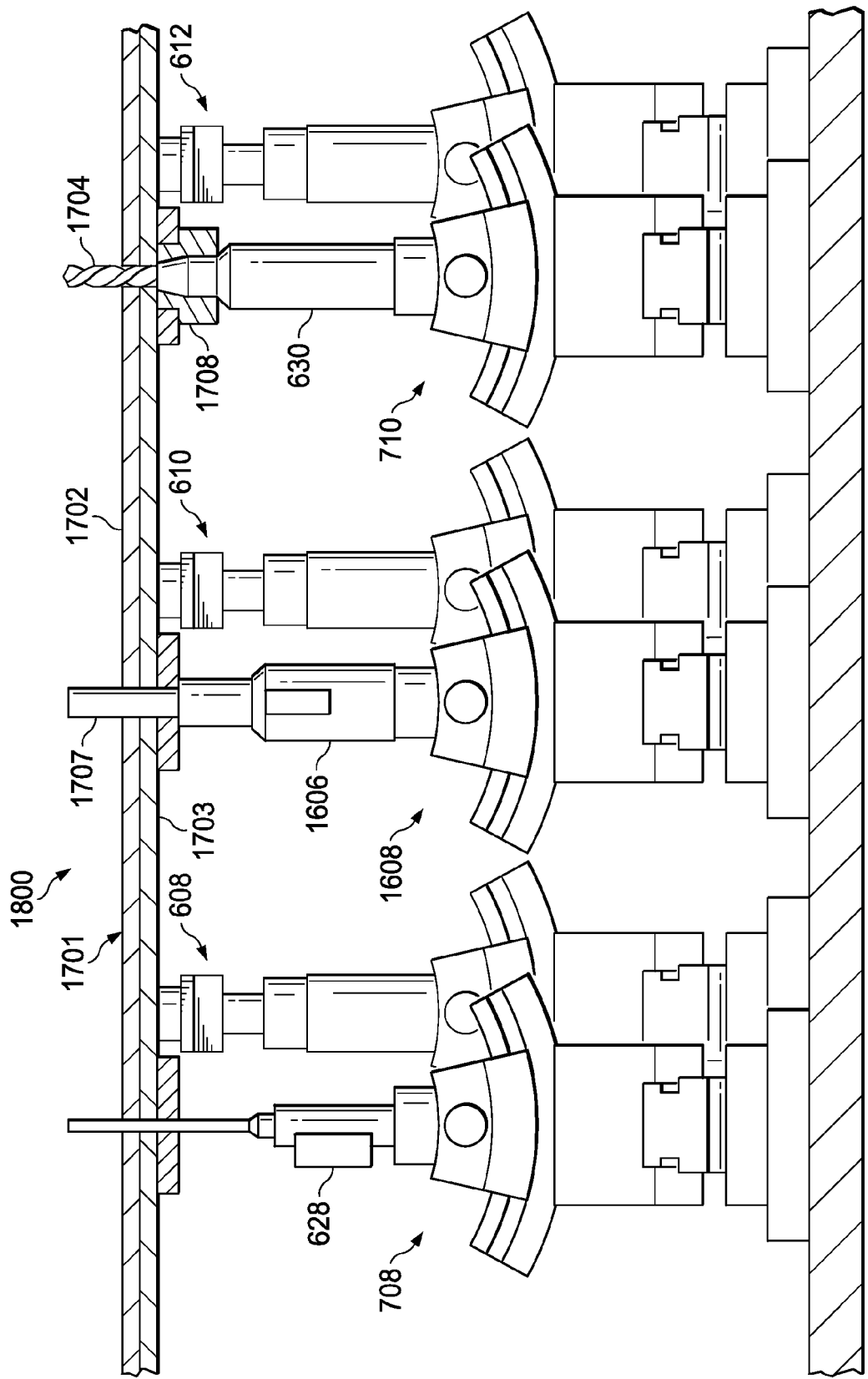
FIG. 18 is an illustration of a cross-sectional view of a manufacturing assembly operating within a manufacturing environment in accordance with an illustrative embodiment.

Turning now to FIG. 18, an illustration of a cross-sectional view of a manufacturing assembly operating within a manufacturing environment is depicted in accordance with an illustrative embodiment. View 1800 may be a cross-sectional view of view 1700 in FIG. 17 along cross-section 18-18 in FIG. 17.

Figure 19:
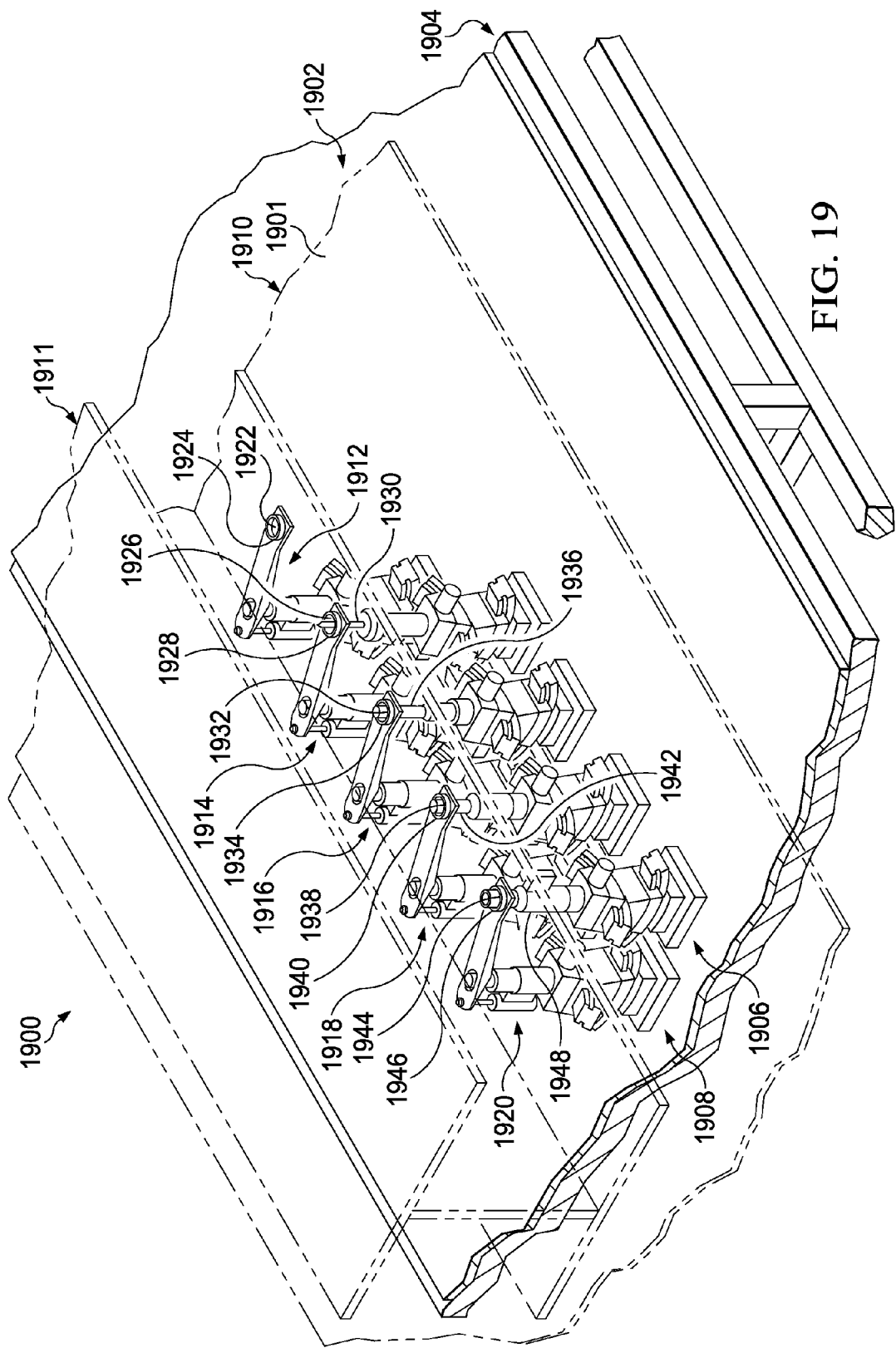
FIG. 19 is an illustration of an isometric view of a manufacturing assembly operating within a manufacturing environment in accordance with an illustrative embodiment.

Turning now to FIG. 19, an illustration of an isometric view of a manufacturing assembly operating within a manufacturing environment is depicted in accordance with an illustrative embodiment. In view 1900, surface 1901 of workpiece 1902 is positioned substantially parallel to base 1904. In view 1900 of plurality of autonomous functional components 1906 and plurality of autonomous clamping components 1908 may work on workpiece 1902. In some illustrative examples, workpiece 1902 may include skin 1910 and support structure 1911.

As depicted, plurality of autonomous functional components 1906 and plurality of autonomous clamping components 1908 may be positioned under surface 1901 of workpiece 1902 during assembly of workpiece 1902 using skin 1910 and support structure 1911. As a result of the positioning of plurality of autonomous functional components 1906 and plurality of autonomous clamping components 1908 under workpiece 1902, plurality of autonomous functional components 1906 and plurality of autonomous clamping components 1908 may work on surface 1901 of workpiece 1902 to connect skin 1910 and support structure 1911.

Plurality of autonomous clamping components 1908 may include clamping component 1912 as well as clamping component 1914, clamping component 1916, clamping component 1918, and clamping component 1920. Clamping component 1912 may be positioned relative to first location 1922 of workpiece 1902. As depicted, clamping component 1912 may be positioned such that operating envelope 1924 is positioned relative to first location 1922 of workpiece 1902. Clamping component 1912 may remain positioned relative to first location 1922 of workpiece 1902 until each of plurality of autonomous functional components 1906 has performed a respective function through operating envelope 1924. Each of plurality of autonomous functional components 1906 may perform a respective function on first location 1922 of workpiece 1902 through operating envelope 1924. As depicted, plurality of autonomous functional components 1906 have not yet performed a respective function through operating envelope 1924.

Clamping component 1914 may be positioned relative to second location 1926 of workpiece 1902. Clamping component 1914 may be positioned such that operating envelope 1928 is positioned relative to second location 1926 of workpiece 1902. Clamping component 1914 may remain positioned relative to second location 1926 of workpiece 1902 until each of plurality of autonomous functional components 1906 has performed a respective function through operating envelope 1928. Each of plurality of autonomous functional components 1906 may perform a respective function on second location 1926 of workpiece 1902 through operating envelope 1928.

As depicted, first functional component 1930 is performing a respective function through operating envelope 1928. In this illustrative example, first functional component 1930 may drill workpiece 1902 at second location 1926.

Clamping component 1916 may be positioned relative to third location 1932 of workpiece 1902. Clamping component 1916 may be positioned such that operating envelope 1934 is positioned relative to third location 1932 of workpiece 1902. Clamping component 1916 may remain positioned relative to third location 1932 of workpiece 1902 until each of plurality of autonomous functional components 1906 has performed a respective function through operating envelope 1934. Each of plurality of autonomous functional components 1906 may perform a respective function on third location 1932 of workpiece 1902 through operating envelope 1934.

As depicted, second functional component 1936 is performing a respective function through operating envelope 1934. In this illustrative example, second functional component 1936 may inspect a hole drilled into workpiece 1902 at third location 1932. First functional component 1930 may have drilled a hole into workpiece 1902 at third location 1932.

Clamping component 1918 may be positioned relative to fourth location 1938 of workpiece 1902. Clamping component 1918 may be positioned such that operating envelope 1940 is positioned relative to fourth location 1938 of workpiece 1902. Clamping component 1918 may remain positioned relative to fourth location 1938 of workpiece 1902 until each of plurality of autonomous functional components 1906 has performed a respective function through operating envelope 1940. Each of plurality of autonomous functional components 1906 may perform a respective function on fourth location 1938 of workpiece 1902 through operating envelope 1940.

As depicted, third functional component 1942 is performing a respective function through operating envelope 1940. In this illustrative example, third functional component 1942 may apply sealant to at least one of a hole drilled into workpiece 1902 at fourth location 1938 or a fastener to be inserted into the hole drilled into workpiece 1902 at fourth location 1938. First functional component 1930 may have drilled a hole into workpiece 1902 at fourth location 1938. Second functional component 1936 may have inspected the hole drilled into workpiece 1902 at fourth location 1938.

Clamping component 1920 may be positioned relative to fifth location 1944 of workpiece 1902. Clamping component 1920 may be positioned such that operating envelope 1946 is positioned relative to fifth location 1944 of workpiece 1902. Clamping component 1920 may remain positioned relative to fifth location 1944 of workpiece 1902 until each of plurality of autonomous functional components 1906 has performed a respective function through operating envelope 1946. Each of plurality of autonomous functional components 1906 may perform a respective function on fifth location 1944 of workpiece 1902 through operating envelope 1946.

As depicted, fourth functional component 1948 is performing a respective function through operating envelope 1946. In this illustrative example, fourth functional component 1948 may insert and secure the fastener inserted into the hole drilled into workpiece 1902 at fifth location 1944. First functional component 1930 may have drilled a hole into workpiece 1902 at fifth location 1944. Second functional component 1936 may have inspected the hole drilled into the workpiece 1902 at fifth location 1944. Third functional component 1942 may have applied sealant to at least one of the hole drilled into workpiece 1902 at fifth location 1944, or the fastener to be inserted into the hole drilled into workpiece 1902 at fifth location 1944.

The illustrations of aircraft 100 in FIG. 1, manufacturing environment 200 in FIG. 2, manufacturing assemblies in FIGS. 3-13 and 16-19, functional component 1400 in FIG. 14, and clamping component 1500 in FIG. 15 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although plurality of autonomous functional components 214 is depicted as having first functional component 216 and second functional component 218, plurality of autonomous functional components 214 may contain any desirable number of functional components greater than or equal to two. For example, plurality of autonomous functional components 214 may include three functional components. As another example, plurality of autonomous functional components 214 may include four functional components. As another example, first plurality of locations 246 may contain more locations than first location 250 and second location 252. As yet another example, first plurality of locations 246 and second plurality of locations 248 may not overlap. As yet a further example, manufacturing environment 200 may include more manufacturing assemblies than manufacturing assembly 204 and second manufacturing assembly 210.

Yet further, manufacturing assembly 204 may include multiple functional components which perform the same function as plurality of functions 212. For example, manufacturing assembly 204 may have three functional components, each performing the same function, such as drilling. As another example, manufacturing assembly 204 may have two functional components, each performing the same function, such as inspection.

Further, manufacturing assembly 204 may include more than one controller. For example, manufacturing assembly 204 may include more controllers than just controller 206. For example, another controller may communicate with at least one of plurality of autonomous functional components 214, plurality of autonomous movement systems 224, or plurality of autonomous clamping components 236 using at least one of wired connection 270 or wireless connection 272. Yet further, manufacturing assembly 204 may include a system of controllers.

Yet further, although FIGS. 3-13 each depict a single functional component on a base to perform each function, in some illustrative examples, more than one functional component that performs the same function may be present. For example, a base may have two functional components per function. In this example, two sets of functional components may be functioning substantially simultaneously on two areas of a workpiece. In another illustrative example, a spare functional component may be present for at least one function.

The different components shown in FIGS. 1 and 3-19 may be combined with components in FIG. 2, used with components in FIG. 2, or a combination of the two. Additionally, some of the components in FIGS. 1 and 3-19 may be illustrative examples of how components shown in block form in FIG. 2 may be implemented as physical structures.

The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Figure 20:
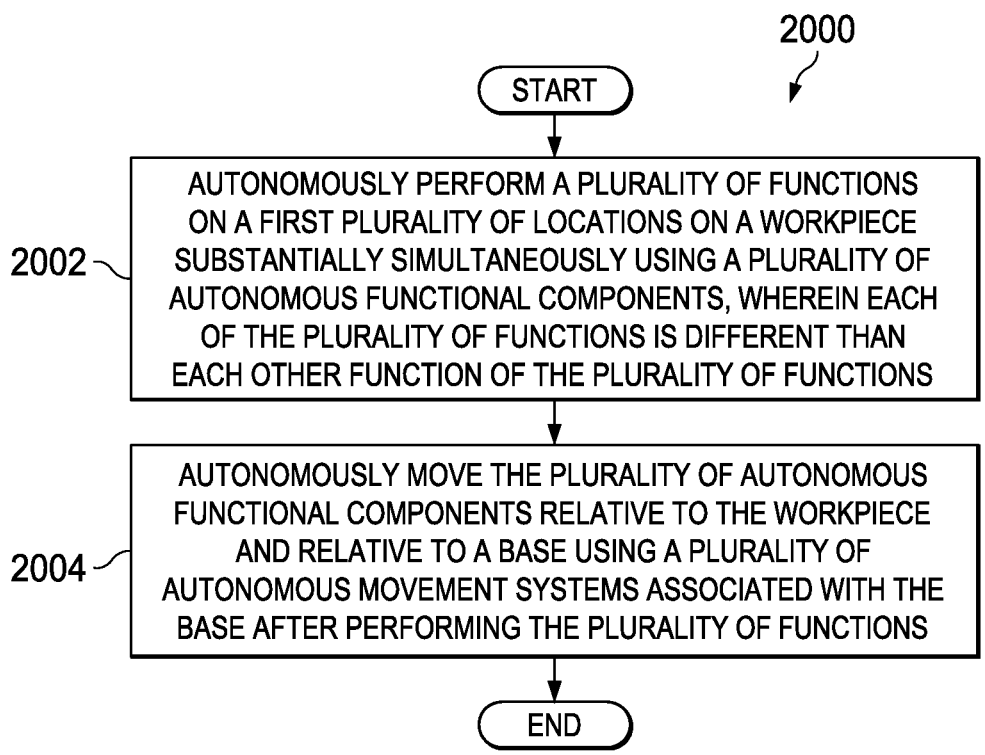
FIG. 20 is an illustration of a flowchart of a process for performing a plurality of functions on a workpiece in accordance with an illustrative embodiment.

Turning now to FIG. 20, an illustration of a flowchart of a process for performing a plurality of functions on a workpiece is depicted in accordance with an illustrative embodiment. Process 2000 may begin by autonomously performing a plurality of functions on a first plurality of locations on a workpiece substantially simultaneously using a plurality of autonomous functional components, wherein each of the plurality of functions is different than each other function of the plurality of functions (operation 2002). In some illustrative examples, the plurality of functions may be performed through operating envelopes of a number of the plurality of autonomous clamping components. In some illustrative examples, the plurality of functions may include at least one of drilling, inspecting, sealing, temporary fastening, inserting an item, or securing an item. In some illustrative examples, each of the plurality of functions may be performed by a different functional component of the plurality of autonomous functional components.

Process 2000 may also autonomously move the plurality of autonomous functional components relative to the workpiece and relative to a base using a plurality of autonomous movement systems associated with the base after performing the plurality of functions (operation 2004). Afterwards the process terminates.

In some illustrative examples, process 2000 may also control at least one of performing the plurality of functions, or moving the plurality of autonomous functional components using a controller in communication with at least one of the plurality of autonomous functional components or the plurality of autonomous movement systems.

In some illustrative examples, process 2000 may also move a clamping component of a plurality of autonomous clamping components relative to the base and the workpiece while at least one of performing the plurality of functions on the first plurality of locations, or after performing the plurality of functions on the first plurality of locations. In moving the clamping component of the plurality of autonomous clamping components relative to the workpiece, the clamping component may move relative to a number of clamping components of the plurality of autonomous clamping components. In some illustrative examples, each of the plurality of functions is performed through an operating envelope of the clamping component prior to moving the clamping component of the plurality of autonomous clamping components. In some illustrative examples, process 2000 may also perform the plurality of functions on a second plurality of locations on the workpiece substantially simultaneously using the plurality of autonomous functional components. In some illustrative examples, the first plurality of locations and the second plurality of locations may have a number of locations in common. Afterwards, the process terminates.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, process 2000 may also position the plurality of autonomous clamping components prior to performing the plurality of functions on the first plurality of locations on the workpiece. As another example, process 2000 may also move a second clamping component of the plurality of autonomous clamping components relative to the workpiece while at least one of performing the plurality of functions on the second plurality of locations, or after performing the plurality of functions on the second plurality of locations.

As a further example, process 2000 may also clamp the workpiece with the clamping component of the plurality of autonomous clamping components, wherein clamping comprises removing an air cushion or a magnetic field from the clamping component of the plurality of autonomous clamping components. As another example, process 2000 may also remove an air cushion or magnetic field from a movement system of the plurality of autonomous movement systems. As yet another example, process 2000 may additionally send data associated with clamping the workpiece with the clamping component of the plurality of autonomous clamping components to a functional component of the plurality of autonomous functional components.

Figure 21:
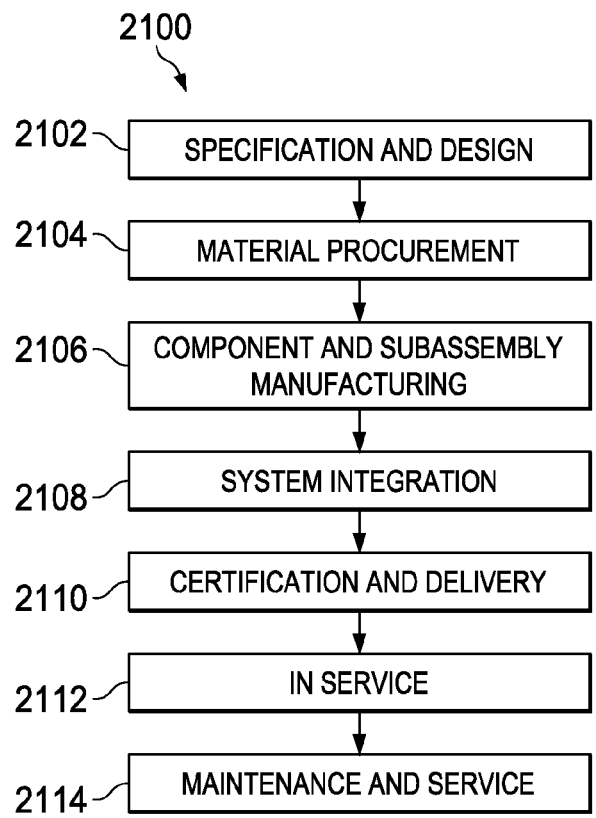
FIG. 21 is an illustration of a block diagram of an aircraft manufacturing and service method in accordance with an illustrative embodiment.

The illustrative embodiments of the disclosure may be described in the context of aircraft manufacturing and service method 2100 as shown in FIG. 21 and aircraft 2200 as shown in FIG. 22. Turning first to FIG. 21, an illustration of a block diagram of an aircraft manufacturing and service method is depicted in accordance with an illustrative embodiment. During pre-production, aircraft manufacturing and service method 2100 may include specification and design 2102 of aircraft 2200 in FIG. 22 and material procurement 2104.

During production, component and subassembly manufacturing 2106 and system integration 2108 of aircraft 2200 in FIG. 22 takes place. Thereafter, aircraft 2200 in FIG. 22 may go through certification and delivery 2110 in order to be placed in service 2112. While in service 2112 by a customer, aircraft 2200 in FIG. 22 is scheduled for routine maintenance and service 2114, which may include modification, reconfiguration, refurbishment, and other maintenance or service.

Each of the processes of aircraft manufacturing and service method 2100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 22, an illustration of a block diagram of an aircraft is depicted in which an illustrative embodiment may be implemented. In this example, aircraft 2200 is produced by aircraft manufacturing and service method 2100 in FIG. 21 and may include airframe 2202 with a plurality of systems 2204 and interior 2206. Examples of systems 2204 include one or more of propulsion system 2208, electrical system 2210, hydraulic system 2212, and environmental system 2214. Any number of other systems may be included. Although an aerospace example is shown, different illustrative embodiments may be applied to other industries, such as the automotive industry.

Figure 23:
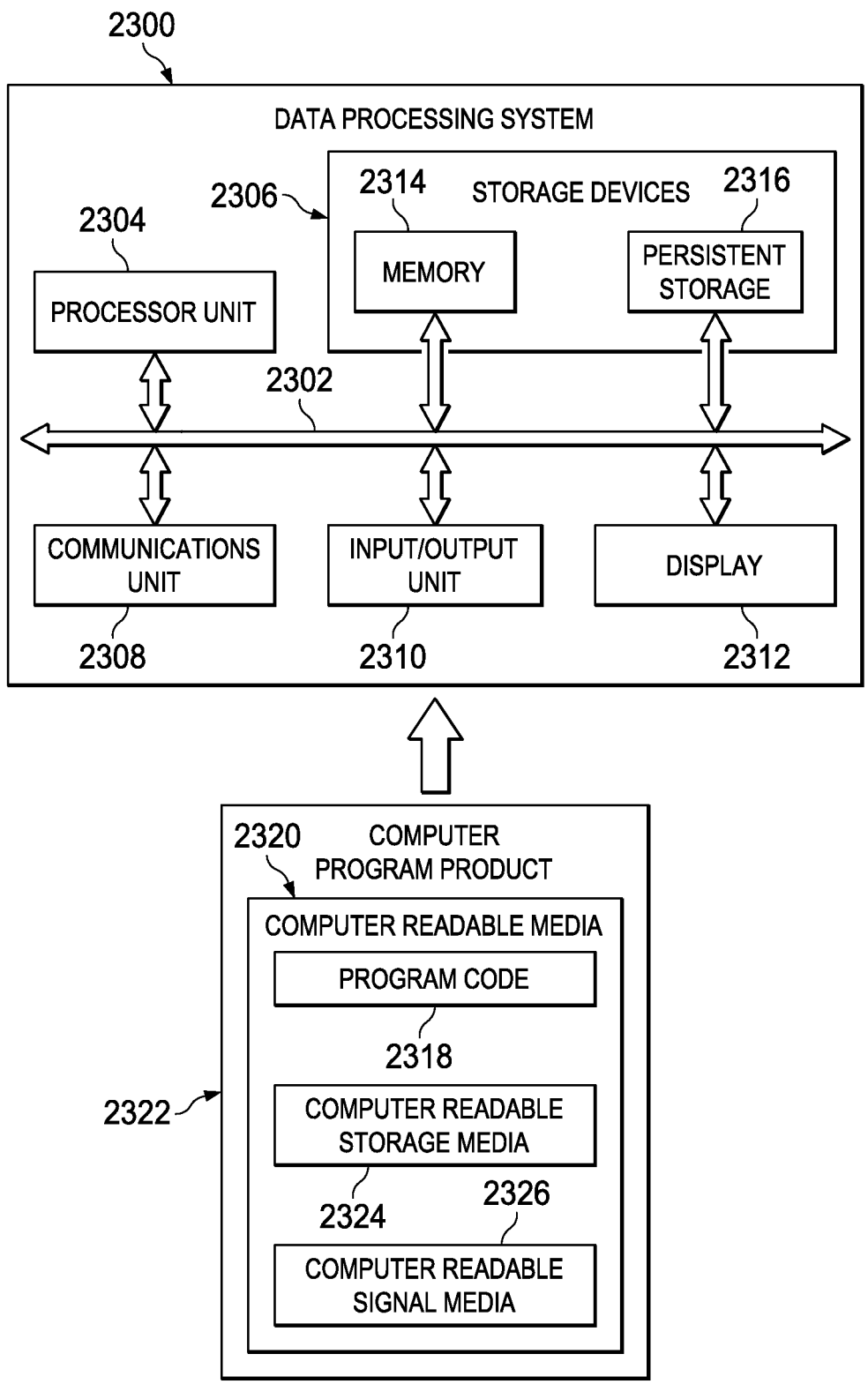
FIG. 23 is an illustration of a data processing system in the form of a block diagram in accordance with an illustrative embodiment.

Turning now to FIG. 23, an illustration of a data processing system is depicted in the form of a block diagram in accordance with an illustrative embodiment. Data processing system 2300 may be used to implement controller 206 in FIG. 2. As depicted, data processing system 2300 includes communications framework 2302, which provides communications between processor unit 2304, storage devices 2306, communications unit 2308, input/output unit 2310, and display 2312. In some cases, communications framework 2302 may be implemented as a bus system.

Processor unit 2304 is configured to execute instructions for software to perform a number of operations. Processor unit 2304 may comprise a number of processors, a multiprocessor core, and/or some other type of processor, depending on the implementation. In some cases, processor unit 2304 may take the form of a hardware unit, such as a circuit system, an application specific integrated circuit (ASIC), a programmable logic device, or some other suitable type of hardware unit.

Instructions for the operating system, applications, and/or programs run by processor unit 2304 may be located in storage devices 2306. Storage devices 2306 may be in communication with processor unit 2304 through communications framework 2302. As used herein, a storage device, also referred to as a computer readable storage device, is any piece of hardware capable of storing information on a temporary and/or permanent basis. This information may include, but is not limited to, data, program code, and/or other information.

Memory 2314 and persistent storage 2316 are examples of storage devices 2306. Memory 2314 may take the form of, for example, a random access memory or some type of volatile or non-volatile storage device. Persistent storage 2316 may comprise any number of components or devices. For example, persistent storage 2316 may comprise a hard drive, a flash memory, a rewritable optical disk, a rewritable magnetic tape, or some combination of the above. The media used by persistent storage 2316 may or may not be removable.

Communications unit 2308 allows data processing system 2300 to communicate with other data processing systems and/or devices. Communications unit 2308 may provide communications using physical and/or wireless communications links.

Input/output unit 2310 allows input to be received from and output to be sent to other devices connected to data processing system 2300. For example, input/output unit 2310 may allow user input to be received through a keyboard, a mouse, and/or some other type of input device. As another example, input/output unit 2310 may allow output to be sent to a printer connected to data processing system 2300.

Display 2312 is configured to display information to a user. Display 2312 may comprise, for example, without limitation, a monitor, a touch screen, a laser display, a holographic display, a virtual display device, and/or some other type of display device.

In this illustrative example, the processes of the different illustrative embodiments may be performed by processor unit 2304 using computer-implemented instructions. These instructions may be referred to as program code, computer usable program code, or computer readable program code and may be read and executed by one or more processors in processor unit 2304.

In these examples, program code 2318 is located in a functional form on computer readable media 2320, which is selectively removable, and may be loaded onto or transferred to data processing system 2300 for execution by processor unit 2304. Program code 2318 and computer readable media 2320 together form computer program product 2322. In this illustrative example, computer readable media 2320 may be computer readable storage media 2324 or computer readable signal media 2326.

Computer readable storage media 2324 is a physical or tangible storage device used to store program code 2318 rather than a medium that propagates or transmits program code 2318. Computer readable storage media 2324 may be, for example, without limitation, an optical or magnetic disk or a persistent storage device that is connected to data processing system 2300.

Alternatively, program code 2318 may be transferred to data processing system 2300 using computer readable signal media 2326. Computer readable signal media 2326 may be, for example, a propagated data signal containing program code 2318. This data signal may be an electromagnetic signal, an optical signal, and/or some other type of signal that can be transmitted over physical and/or wireless communications links.

The apparatuses and methods embodied herein may be employed during at least one of the stages of aircraft manufacturing and service method 2100 in FIG. 21. One or more illustrative embodiments may be used during component and subassembly manufacturing 2106. For example, manufacturing assembly 204 may be used to work on components such as workpiece 202 of FIG. 2 during component and subassembly manufacturing 2106. Further, manufacturing assembly 204 may also be used to perform maintenance during maintenance and service 2114.

The illustrative embodiments may provide a method for performing functions on a workpiece. The illustrative embodiments may also provide a method for substantially simultaneously performing a plurality of functions on a workpiece. The plurality of functions may be a series of sequential functions. Each of the functions may be a different function from each other function. By substantially simultaneously performing a plurality of functions, at least one of manufacturing time and manufacturing cost may be reduced. Further, by substantially simultaneously performing a plurality of functions, downtime for functional components may be reduced. For example, by substantially simultaneously performing a plurality of functions, downtime may be less than downtime for a robotic arm due to movement and changing end effectors on a robotic arm. Further, by substantially simultaneously performing a plurality of functions, downtime may be less than downtime for end effectors which may be used by a robotic arm.

In some illustrative examples, manufacturing time for the plurality of functions may be reduced by about 75%. In some illustrative examples, manufacturing time for the plurality of functions may be reduced by 80%.

The plurality of functions may also be called operations. Operations may be performed in series and in succession as a ballet of self-propelled and auto controlled clamping and functional component coordination of assembly operations and then relocation and re-coordination at a new location. A succession of operations may be performed at each of a plurality of locations across the workpiece. A succession of clamping and functional components may be moved in series/succession. The movement of the functional components may facilitate at least one of clamping, drilling, inspection, temporary fastener placement, or final fastener install. An individual clamping component may stay in a single location until all desired functional components have completed work. For example, a first clamping component may stay in a first location until each of drilling, inspection, fastener installation, and sealing have been performed.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method comprising:
   autonomously performing a plurality of functions on a first plurality of locations on a workpiece substantially simultaneously using a plurality of autonomous functional components, wherein each of the plurality of functions is different than each other function of the plurality of functions; and
   autonomously moving the plurality of autonomous functional components relative to the workpiece and relative to a base by changing positions at which the plurality of functional components are connected to a surface of the base using a plurality of autonomous movement systems configured to move across the surface of the base, wherein the base is movable with respect to the workpiece.

2. The method of claim 1 further comprising:
   controlling at least one of the autonomously performing the plurality of functions or the autonomously moving the plurality of autonomous functional components using a controller in communication with at least one of the plurality of autonomous functional components or the plurality of autonomous movement systems.

3. The method of claim 2, wherein the controller is associated with at least one of a functional component of the plurality of autonomous functional components or a movement system of the plurality of autonomous movement systems.

4. The method of claim 1 further comprising:
   moving a clamping component of a plurality of autonomous clamping components relative to the base and the workpiece while at least one of performing the plurality of functions on the first plurality of locations, or after performing the plurality of functions on the first plurality of locations, wherein moving the clamping component relative to the base and the workpiece comprises moving one of the plurality of autonomous movement systems connected to the clamping component across the surface of the base to change a position at which the clamping component is connected to the surface of the base; and
   performing the plurality of functions on a second plurality of locations on the workpiece substantially simultaneously using the plurality of autonomous functional components.

5. The method of claim 4 further comprising:
   positioning the plurality of autonomous clamping components prior to performing the plurality of functions on the first plurality of locations on the workpiece.

6. The method of claim 4, wherein the plurality of functions are performed through operating envelopes of a number of clamping components of the plurality of autonomous clamping components.

7. The method of claim 4, wherein in moving the clamping component of the plurality of autonomous clamping components relative to the workpiece, the clamping component moves relative to a number of clamping components of the plurality of autonomous clamping components.

8. The method of claim 4, wherein the first plurality of locations and the second plurality of locations have a number of locations in common.

9. The method of claim 1, wherein the plurality of functions includes at least one of drilling, inspecting, sealing, temporary fastening, inserting an item, or securing the item.

10. The method of claim 4, wherein the each of the plurality of functions is performed through an operating envelope of the clamping component prior to moving the clamping component of the plurality of autonomous clamping components.

11. The method of claim 10, wherein the each of the plurality of functions is performed by a different functional component of the plurality of autonomous functional components.

12. The method of claim 4 further comprising:
   moving a second clamping component of the plurality of autonomous clamping components relative to the workpiece while at least one of performing the plurality of functions on the second plurality of locations, or after performing the plurality of functions on the second plurality of locations, wherein moving the second clamping component relative to the workpiece comprises moving one of the plurality of autonomous movement systems connected to the second clamping component across the surface of the base to change a position at which the second clamping component is connected to the surface of the base.

13. The method of claim 1, wherein a movement system in the plurality of autonomous movement systems utilizes an air cushion or a magnetic field and further comprising:

removing the air cushion or the magnetic field from the movement system of the plurality of autonomous movement systems.

14. The method of claim 4 further comprising:
clamping the workpiece with the clamping component of the plurality of autonomous clamping components, wherein the clamping component utilizes an air cushion or a magnetic field and wherein clamping comprises:
removing the air cushion or the magnetic field from the clamping component of the plurality of autonomous clamping components.

15. The method of claim 1 further comprising:
moving the base with respect to the workpiece using a movement assembly connected to the base, wherein moving the base with respect to the workpiece also moves the plurality of autonomous functional components relative to the workpiece.

16. The method of claim 1 further comprising:
repeatedly performing the plurality of functions on the workpiece using the plurality of autonomous functional components; and
autonomously moving the plurality of autonomous functional components relative to the workpiece and relative to the base using the plurality of autonomous movement systems associated with the base each time the plurality of functions is performed on the workpiece so that each of the plurality of functions is performed in series on each respective location of the first plurality of locations.

17. The method of claim 1 further comprising:
performing each of the plurality of functions in succession on the first plurality of locations.

18. An apparatus comprising:
a base comprising a surface, wherein the base is movable with respect to a workpiece;
a plurality of autonomous functional components, in which each autonomous functional component of the plurality of autonomous functional components is configured to perform a respective function; and
a plurality of autonomous movement systems associated with the base, in which each of a first number of the plurality of autonomous movement systems is connected to a respective functional component of the plurality of autonomous functional components, and wherein the plurality of autonomous movement systems are configured to move across the surface of the base to change positions at which the plurality of autonomous functional components are connected to the surface of the base.

19. The apparatus of claim 18, wherein each functional component of the plurality of autonomous functional components is configured to perform a respective single function.

20. The apparatus of claim 18 further comprising:
a plurality of autonomous clamping components, and wherein each of a second number of the plurality of autonomous movement systems is associated with a respective clamping component of the plurality of autonomous clamping components.

21. The apparatus of claim 20 further comprising:
a controller in communication with at least one of a functional component of the plurality of autonomous functional components, a clamping component of the plurality of autonomous clamping components, or a movement system of the plurality of autonomous movement systems.

22. The apparatus of claim 20, wherein the plurality of autonomous clamping components has a plurality of operating envelopes.

23. The apparatus of claim 22, wherein each of the plurality of autonomous functional components are configured to perform a respective single function through a respective operating envelope of the plurality of operating envelopes.

24. The apparatus of claim 18 further comprising:
a movement assembly connected to the base configured to move the base relative to a workpiece.

25. The apparatus of claim 20, wherein the plurality of autonomous clamping components is greater in number than the plurality of autonomous functional components.

26. The apparatus of claim 19, wherein each functional component of the plurality of autonomous functional components is configured to perform a different single function from each other functional component of the plurality of autonomous functional components.

27. The apparatus of claim 18, wherein a plurality of functions performed by the plurality of autonomous functional components includes at least one of drilling, inspecting, sealing, temporary fastening, inserting an item, or securing the item.

28. The apparatus of claim 18, wherein the plurality of autonomous movement systems are selected from at least one of sawyer motors, magnetic systems, wheel systems, or track systems.

29. The apparatus of claim 18, wherein the surface of the base has a constant curvature.

30. An apparatus comprising:
a base comprising a surface;
a movement assembly connected to the base and configured to move the base relative to a workpiece;
a plurality of autonomous clamping components having a plurality of operating envelopes positioned relative to a plurality of locations of the workpiece when the plurality of autonomous clamping components apply pressure to the workpiece;
a plurality of autonomous functional components, in which each functional component of the plurality of autonomous functional components is configured to perform a different respective single function on a respective location of the plurality of locations of the workpiece through a respective operating envelope of the plurality of operating envelopes;
a plurality of autonomous movement systems associated with the base such that the plurality of autonomous movement systems is configured to move across the surface of the base, in which each of the plurality of autonomous movement systems is connected to a respective functional component of the plurality of autonomous functional components or a respective clamping component of the plurality of autonomous clamping components such that the plurality of autonomous movement systems is configured to change positions at which the plurality of autonomous functional components and the plurality of autonomous clamping components are connected to the surface of the base; and
a controller in communication with at least one of the movement assembly, the plurality of autonomous clamping components, the plurality of autonomous functional components, or the plurality of autonomous movement systems.

31. The apparatus of claim 30, wherein the plurality of autonomous clamping components is greater in number than the plurality of autonomous functional components, such that at least one clamping component in the plurality of clamping components is configured to move while the remaining clamping components in the plurality of clamping components are stationary.

32. An apparatus comprising:
  a base comprising a surface;
  a plurality of autonomous functional components, in which each autonomous functional component of the plurality of autonomous functional components is configured to perform a respective function;
  a plurality of autonomous movement systems associated with the base, in which each of a first number of the plurality of autonomous movement systems is connected to a respective functional component of the plurality of autonomous functional components, and wherein the plurality of autonomous movement systems are configured to move the plurality of autonomous functional components across the surface of the base to change positions at which the plurality of autonomous functional components are connected to the surface of the base; and
  a movement assembly connected to the base and configured to move the base to different areas with respect to a workpiece and such that the surface of the base faces the workpiece at the different areas with respect to the workpiece.

\* \* \* \* \*